(12) United States Patent
Wagh et al.

(10) Patent No.: US 8,858,702 B2
(45) Date of Patent: Oct. 14, 2014

(54) INORGANIC PHOSPHATE COMPOSITIONS AND METHODS

(75) Inventors: Arun S. Wagh, Naperville, IL (US); William George, Spartanburg, SC (US); Vadym Drozd, Miami, FL (US); Kausik Mukhopadhyay, Falls Church, VA (US); Sameerkumar Vasantlal Patel, Raleigh, NC (US)

(73) Assignee: Latitude 18, Inc., Pompano Beach, FL (US)

(*) Notice: Subject to any disclaimer, the term of this patent is extended or adjusted under 35 U.S.C. 154(b) by 80 days.

(21) Appl. No.: 12/965,789

(22) Filed: Dec. 10, 2010

(65) Prior Publication Data

US 2011/0143910 A1    Jun. 16, 2011

Related U.S. Application Data

(60) Provisional application No. 61/285,948, filed on Dec. 11, 2009.

(51) Int. Cl.
| | | |
|---|---|---|
| *C04B 12/02* | (2006.01) | |
| *C04B 28/34* | (2006.01) | |
| *B05D 1/36* | (2006.01) | |
| *B05D 7/00* | (2006.01) | |
| *C04B 35/622* | (2006.01) | |
| *C09D 1/06* | (2006.01) | |
| *C01B 25/36* | (2006.01) | |
| *C04B 35/447* | (2006.01) | |
| *C01B 25/45* | (2006.01) | |
| *C04B 111/00* | (2006.01) | |

(52) U.S. Cl.
CPC ....... *C04B 35/447* (2013.01); *C04B 2235/3206* (2013.01); *C04B 35/62204* (2013.01); *C09D 1/06* (2013.01); *C04B 2235/3244* (2013.01); *C04B 2235/9661* (2013.01); *C04B 2111/00172* (2013.01); *C04B 2235/3463* (2013.01); *C04B 2235/3262* (2013.01); *C04B 2235/3201* (2013.01); *C01B 25/36* (2013.01); *C04B 28/34* (2013.01); *C04B 2235/3284* (2013.01); *C04B 2235/3418* (2013.01); *C04B 2235/3208* (2013.01); *C04B 2235/3217* (2013.01); *C01B 25/45* (2013.01)
USPC .......................................... 106/690; 427/403

(58) Field of Classification Search
USPC .......................................... 106/690; 427/403
See application file for complete search history.

(56) References Cited

U.S. PATENT DOCUMENTS

| 2,257,281 A | 9/1941 | Scholz |
| 2,329,065 A | 9/1943 | Lum et al. |

(Continued)

FOREIGN PATENT DOCUMENTS

| EP | 0256908 | 2/1988 |
| EP | 0359002 | 3/1993 |

(Continued)

OTHER PUBLICATIONS

Chaplin, Mark. "Guar Gum". London South Park University. Feb. 23, 2004 [Retrieved on Nov. 26, 2013]. Retrieved from http://web.archive.org/web/20040223090608/http://www.lsbu.ac.uk/water/hygua.html.*

(Continued)

*Primary Examiner* — Melvin C Mayes
*Assistant Examiner* — Karam Hijji
(74) *Attorney, Agent, or Firm* — Christopher J. Knors; Moore & Van Allen PLLC

(57) ABSTRACT

Disclosed and described are multi-component inorganic phosphate formulations of acidic phosphate components and basic oxide/hydroxide components. Also disclosed are high solids, atomizable compositions of same, suitable for spray coating.

21 Claims, 6 Drawing Sheets

(56) References Cited

U.S. PATENT DOCUMENTS

| | | | |
|---|---|---|---|
| 2,450,952 A | 10/1948 | Greger | |
| 3,184,320 A | 5/1965 | Michael | |
| 3,392,007 A | 7/1968 | Ivan et al. | |
| 3,973,056 A | 8/1976 | Fessler et al. | |
| 4,021,528 A | 5/1977 | Schlegel | |
| 4,083,933 A | 4/1978 | Schlegel | |
| 4,339,405 A | 7/1982 | Paszner | |
| 4,395,456 A | 7/1983 | Jackson et al. | |
| 4,478,805 A | 10/1984 | Langer et al. | |
| 4,504,555 A | 3/1985 | Prior et al. | |
| 4,683,151 A | 7/1987 | Hamaguchi et al. | |
| 4,721,659 A | 1/1988 | Tieckelmann et al. | |
| 4,756,762 A | 7/1988 | Weill et al. | |
| 4,799,652 A | 1/1989 | Daussan et al. | |
| 4,839,049 A | 6/1989 | Kinney, Jr. et al. | |
| 5,002,610 A | 3/1991 | Sherif et al. | |
| 5,024,825 A | 6/1991 | Buhl et al. | |
| 5,039,454 A | 8/1991 | Policastro et al. | |
| 5,135,576 A | 8/1992 | Johansen et al. | |
| 5,173,960 A | 12/1992 | Dickinson | |
| 5,182,049 A | 1/1993 | Von Bonin | |
| 5,283,276 A | 2/1994 | Best et al. | |
| 5,302,563 A | 4/1994 | Rumpeltin et al. | |
| 5,338,356 A | 8/1994 | Hirano et al. | |
| 5,401,538 A | 3/1995 | Perito | |
| 5,494,708 A | 2/1996 | Chess, Jr. | |
| 5,597,120 A * | 1/1997 | Chess, Jr. | 239/307 |
| 5,624,493 A | 4/1997 | Wagh et al. | |
| 5,645,518 A | 7/1997 | Wagh et al. | |
| 5,718,757 A | 2/1998 | Guillou et al. | |
| 5,830,815 A | 11/1998 | Wagh et al. | |
| 5,846,894 A | 12/1998 | Singh et al. | |
| 5,911,819 A | 6/1999 | Drs et al. | |
| 5,954,867 A | 9/1999 | Chow et al. | |
| 5,968,240 A | 10/1999 | Myers et al. | |
| 6,103,007 A | 8/2000 | Wu et al. | |
| 6,133,498 A | 10/2000 | Singh et al. | |
| 6,136,088 A | 10/2000 | Farrington | |
| 6,153,809 A | 11/2000 | Singh et al. | |
| 6,204,214 B1 | 3/2001 | Singh et al. | |
| 6,399,021 B1 | 6/2002 | Heimann et al. | |
| 6,458,423 B1 | 10/2002 | Goodson | |
| 6,461,415 B1 | 10/2002 | Sambasivan et al. | |
| 6,498,119 B2 | 12/2002 | Wagh et al. | |
| 6,518,212 B1 | 2/2003 | Wagh et al. | |
| 6,561,269 B1 | 5/2003 | Brown et al. | |
| 6,569,263 B2 | 5/2003 | Brown et al. | |
| 6,723,162 B1 | 4/2004 | Cheyrezy et al. | |
| 6,776,837 B2 | 8/2004 | Wagh et al. | |
| 6,783,799 B1 * | 8/2004 | Goodson | 427/140 |
| 6,790,275 B2 | 9/2004 | Macklin et al. | |
| 6,910,537 B2 | 6/2005 | Brown et al. | |
| 6,929,865 B2 | 8/2005 | Myrick | |
| 7,001,860 B2 | 2/2006 | Wagh et al. | |
| 7,083,672 B2 | 8/2006 | Wagh et al. | |
| 7,160,383 B2 | 1/2007 | Wagh et al. | |
| RE39,804 E | 9/2007 | Wu et al. | |
| 7,294,291 B2 | 11/2007 | Wagh et al. | |
| 7,312,171 B2 | 12/2007 | Wagh et al. | |
| 7,402,542 B2 | 7/2008 | Wagh et al. | |
| 7,438,755 B2 | 10/2008 | Wagh et al. | |
| 7,699,928 B2 | 4/2010 | Paul | |
| 2002/0009622 A1 | 1/2002 | Goodson | |
| 2002/0123422 A1 | 9/2002 | Wagh et al. | |
| 2002/0179190 A1 | 12/2002 | Brown et al. | |
| 2003/0092554 A1 | 5/2003 | Wagh et al. | |
| 2003/0150614 A1 | 8/2003 | Brown et al. | |
| 2004/0206267 A1 | 10/2004 | Sambasivan et al. | |
| 2005/0028705 A1 | 2/2005 | Wagh et al. | |
| 2005/0160944 A1 | 7/2005 | Wagh et al. | |
| 2005/0229809 A1 | 10/2005 | Lally | |
| 2005/0241535 A1 * | 11/2005 | Bohner | 106/690 |
| 2005/0258405 A1 | 11/2005 | Sayala | |
| 2005/0274290 A1 | 12/2005 | Wagh et al. | |
| 2005/0288174 A1 | 12/2005 | Wagh et al. | |
| 2005/0288175 A1 | 12/2005 | Wagh et al. | |
| 2006/0003886 A1 | 1/2006 | Wagh et al. | |
| 2006/0048682 A1 | 3/2006 | Wagh et al. | |
| 2006/0235258 A1 | 10/2006 | Wagh et al. | |
| 2007/0051271 A1 | 3/2007 | Kruse et al. | |
| 2007/0051278 A1 | 3/2007 | Wagh et al. | |
| 2007/0235702 A1 | 10/2007 | Wagh et al. | |
| 2007/0284120 A1 | 12/2007 | Rowen | |
| 2008/0020145 A1 | 1/2008 | Pipko et al. | |
| 2008/0119682 A1 | 5/2008 | Wagh et al. | |
| 2008/0156225 A1 | 7/2008 | Bury | |
| 2008/0286609 A1 | 11/2008 | Surace et al. | |
| 2009/0020186 A1 | 1/2009 | Pipko et al. | |
| 2009/0075051 A1 | 3/2009 | Fyfe | |
| 2009/0176110 A1 | 7/2009 | Pabla et al. | |
| 2009/0197991 A1 | 8/2009 | Bury et al. | |
| 2009/0246389 A1 | 10/2009 | Mosser et al. | |
| 2010/0083877 A1 | 4/2010 | Selph et al. | |
| 2010/0247321 A1 | 9/2010 | Kulkarni et al. | |

FOREIGN PATENT DOCUMENTS

| | | |
|---|---|---|
| EP | 0739953 | 10/1996 |
| EP | 2 088 225 A1 | 8/2009 |
| GB | 2180231 | 3/1987 |
| JP | 07024815 | 1/1995 |
| WO | WO9402428 | 2/1994 |
| WO | 95/35266 A1 | 12/1995 |
| WO | WO2004015005 | 2/2004 |
| WO | 2006/001891 A1 | 1/2006 |
| WO | 2007/001344 A2 | 1/2007 |
| WO | WO2009118072 | 10/2009 |
| WO | WO 2010/096827 A1 | 8/2010 |

OTHER PUBLICATIONS

Korean Intellectual Property Office, PCT International Search Report and Written Opinion of the International Searching Authority for International Application No. PCT/US2010/059958 dated Aug. 23, 2011.

Laufenberg, Theodore L., et al., "Phosphate-Bonded Ceramic-Wood Composites: R&D Project Overview and Invitation to Participate", Proceedings of Ninth International Conference on Inorganic-Bonded Composite Materials, Oct. 2004.

Korean Intellectual Property Office, PCT International Search Report and Written Opinion of the International Searching Authority for International Application No. PCT/US2010/046126 dated Feb. 28, 2011.

Korean Intellectual Property Office, PCT International Preliminary Report on Patentability and Written Opinion of the International Searching Authority for International Application No. PCT/US2010/059958 dated Jun. 12, 2012.

Gorecki, George, Improved Iron Phosphate Corrosion Resistance by Modification with Metal Ions, Metal Finishing, Mar. 1995, pp. 36-39.

The International Bureau of WIPO, PCT International Preliminary Report on Patentability and Written Opinion of the International Searching Authority for International Application No. PCT/US2010/025096 dated Aug. 23, 2011.

Chinese Patent Office, Chinese Patent Application No. 201080056375.X Office Action dated Oct. 8. 2013, pp. 1-6.

European Patent Office, European Application No. 10836780.6 Supplementary European Search Report dated Jun. 21, 2013, pp. 1-10.

Australian Patent Office, Australian Patent Application No. 2010327923 Office Action dated Feb. 28, 2014, pp. 1-11.

* cited by examiner

INORGANIC PHOSPHATE COMPOSITIONS AND METHODS

TECHNICAL FIELD

This disclosure relates to multi-component inorganic phosphate formulations of acidic phosphate components and basic oxide/hydroxide components.

BACKGROUND

Organic synthetic materials made of epoxy, polyester, polypropylene and other polymers are widely used in composites such as fiber boards, glass fiber composites, sealants for marble and granite countertop surfaces, aircrafts, body armors etc. These resins are relatively expensive, have a high green house gas intensity and are flammable. The volatile organic compounds released by them during their use present a health hazard for a user.

Technologies exist for formulating inorganic mineral based resins but these are usually based on alkali metal aluminosilicates and alkali metal boroaluminosilicates. These technologies for the most part are limited to one type of formulation and do not always allow for the manufacture of resins with wide range of formulations, properties and uses.

Phosphate ceramics and ceramics that are made by acid-base reactions between phosphoric acid, or an acid-phosphate, and a metal oxide are generally known. The products disclosed in these patents are hard, and replicate properties of either cement or ceramic, or both.

Rapidly setting compositions such as phosphate ceramics heretofore have proven difficult to spray coat (and atomize) onto surfaces so as to provide a smooth, paint-like finish. For example, conventional hydraulic cements can be sputtered coated, but the sputtered coating cannot provide a smooth, paint-like finish as it difficult to obtain good mixing with a high viscosity, unsuspended matrix, and such coatings contain significant amounts of unreacted precursor materials that tend to result in a grainy surface texture. Also, mixing a conventional hydraulic cement for extended times in order to improve its homogeneity typically results in the mixture setting before or during spray coating. Using additional aggregates with the starting precursors in these conventional formulations exacerbates the problem of providing a smooth paint-like finish, especially if such aggregates are of a size greater than about 300 mesh. Thus, conventional hydraulic cements, have heretofore not been successfully formulated such that they are reliably atomizable.

Another problem, specific to phosphate ceramics, is that they are generally translucent after application and set. Using color aggregate in atomizible phosphate ceramics to provide color to these formulations poses challenges. Using too small a natural mineral aggregate (e.g., to avoid unwanted texture) in these formulations results in coatings that generally appear white or weakly colored and are therefore not acceptable even at greater than conventional loadings of the colorant. Using high loadings of solids and/or larger aggregates in these formulations are generally avoided for rheological difficulties and difficulty atomizing.

On the other hand, textured, atomizable phosphate ceramic coatings, using larger aggregates (including large aggregate colorants such as colored sand aggregates) have heretofore proven difficult to achieve, partly because the larger aggregates can clog the spray/atomizing equipment and the composition must be formulated such that it can hold the large aggregate particles, but at the same time set before the aggregate migrates, for example, down a vertical surface or overhead surface. Conventional, non-ceramic paints, in contrast, provide too thin a coating to hold large aggregate for texturing and highlighting, at least in part because they have too low a viscosity and because they take too long to set.

SUMMARY

In general, disclosed herein are multi-component formulations comprising at least one acidic phosphate first component and at least one alkaline second component, the first and second components being suitable for providing, upon combination, an inorganic phosphate composition.

Also disclosed herein are techniques for carrying out the chemical reactions necessary to inexpensively manufacture commercial viable inorganic synthetic compositions having high strength and other useful properties that are useful in making products and/or improving existing products. One aspect disclosed herein relates to a method for manufacturing chemically stable multi-component inorganic phosphate precursors capable of extended storage and transport. In one specific aspect disclosed herein, a method for modifying inorganic phosphate precursor solutions so as to produce high-strength, rapid-setting phosphate compositions is disclosed. In another specific aspect disclosed herein, inorganic phosphate compositions of low density, reduced crystalline morphology are provided. Other embodiments relate to a method for the manufacture of inorganic phosphate compositions for the thermal conversion to materials comprising a berlinite ($AlPO_4$) phase, useful as a fire-resistant coating. In general, the aspects disclosed herein include manufacturing methods that use environmentally friendly techniques to provide improved efficiencies in the commercial production of these inorganic phosphate precursors and composition.

It is also disclosed herein a solution to the aforementioned problem associated with the texturing and/or coloring of translucent phosphate ceramics formulated for spray coating and/or atomizing said compositions. Thus, the instant sprayable inorganic phosphate precursor composition comprises aggregate of up to about 30 mesh or larger and can be sprayed at a relatively thin thickness yet still hold the aggregate as well as set fast enough before the aggregate migrates or dislodges from the point of application, e.g., down a wall or from a ceiling surface. Such spray coated phosphate ceramic compositions produce high-strength, rapid-setting phosphate ceramic coatings of aesthetically pleasing colors. Such compositions can also provide corrosion protection and/or be used as an undercoating in combination with a polymeric coating, such as an acrylic- or urethane-based coating. In one aspect, said phosphate spray coating compositions are suitable for spray coating on metal surfaces, for example, structural elements and chassis of transportation vehicles such as automobiles, trains, cycles, aerospace vehicles, trucks, and buses.

Some of the precursor components and compositions disclosed and described herein are based on phosphoric acid or phosphate salt solutions. Certain embodiments employ sparsely-soluble oxides and sparsely-soluble oxide minerals, which are oxides and oxide minerals that have limited solubility in water at neutral pH. The precursor components comprise at least one acidic phosphate component (first component) and at least one basic oxide/hydroxide component (the second component).

In one aspect, the first component is prepared as an aqueous solution of phosphoric acid or phosphate salts such that the solution has a pH of about 1.5 to about 5. In one aspect, aqueous solutions comprising the first component having pH below 1.5 and/or above 5 are excluded.

In another aspect, the second component is prepared by the slow addition of the sparsely-soluble oxides, or the sparsely-soluble oxide minerals to an aqueous solution of pH of 9-14.

In yet another aspect, the sparsely-soluble oxide, or sparsely-soluble hydroxide are provided as a component of a brine solution derived from a natural source and optionally modified so as to provide an effective amount of the sparsely-soluble oxide in the form of its hydroxide. For example, magnesium brine comprising an effective amount of magnesium hydroxide, optionally with effective amounts of chlorides, oxychloride, sulphates, and oxysulphates is used. The use of such liquid sources of the sparsely-soluble oxide in the form of its hydroxide allows for the elimination or reduction of problems associated with the good wetting of individual grains of powders typically employed in the preparation of inorganic phosphate materials, and avoids or reduces any excessively exothermic reactions.

As shown in the examples set forth below, the resulting inorganic phosphate compositions prepared from the aforementioned first and second precursor components has a unique morphological structure. The instantly mixed formulation or the set product can be used as a thin/thick coating, paint, instant adhesive, or as a matrix for composites, or as anti-corrosion or fire resistant coating for use on metal and non-metal structural materials.

In one embodiment, a method of producing a phosphate composition is provided. The method comprises providing a first component comprising an aqueous solution of an acid-phosphate of chemical formula $A^m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5. A second component is provided comprising an aqueous solution of an alkaline oxide or alkaline hydroxide represented by $B^{2m}O_m$, $B(OH)_{2m}$, or mixtures thereof, where B is an element of valency 2m (m=1, 1.5, or 2) the second component solution adjusted to a pH of between 9-14. The first component and the second component are combined together to provide an inorganic phosphate composition. Optionally, aggregate colorants can be added of a size and of an amount so as to impart a visible color to the set product.

In a first aspect of the first embodiment, the pH of the first component is adjusted to between about 2.5 to about 5, or between about 3 to about 4.5.

In a second aspect of the first embodiment, the first component comprises phosphoric acid, a dihydrogen phosphate salt of formula $M^m(H_2PO_4)_m$ and its hydrates, or mixtures thereof; where M sodium, potassium, magnesium, calcium, aluminum, or mixtures thereof, and m is 1-3.

In a third aspect of the first embodiment, the first component comprises at least two of an alkali dihydrogen phosphate $M(H_2PO_4)$ or its hydrate, phosphoric acid, an alkali earth dihydrogen phosphate $M(H_2PO_4)_2$ or its hydrate, or a trivalent metal trihydrogen phosphate $MH_3(PO_4)_2$ or its hydrate.

In a forth aspect of the first embodiment, the first component comprises a metal hydrophosphate represented by the formula $M_3(PO_4)_2$ and its hydrates, where M is aluminum (III), iron (III), manganese (III), lanthanides selected from lanthanum (III), cerium (III), yttrium (III), scandium (III), and mixtures thereof.

In a fifth aspect of the first embodiment, the first component comprises mono potassium phosphate or its hydrate, in combination with one or more of phosphoric acid or aluminum trihydrogen phosphate or its hydrate such that the pH of the solution is between 2-5. A is sodium, potassium, cesium, iron (II), iron (III), magnesium (II), zinc (II), aluminum (III), bismuth (III), zirconium (IV) or mixtures thereof.

In a sixth aspect of the first embodiment, the first component comprises phosphoric acid, alkali metal dihydrogen phosphate $MH_2PO_4$, alkali earth dihydrogen phosphate $M(H_2PO_4)_2$ or its hydrate, transition metal trihydrogen phosphate $MH_3(PO_4)_2$ or its hydrate, or mixtures thereof, in combination with an alkali metal oxide, alkali metal hydroxide, alkali earth metal oxide, or a basic mineral.

In combination with any of the previous aspects of the first embodiment, the pH of the second component is adjusted to between about 9 to about 13 or between about 10 to about 12, or between about 10 to about 11.

In combination with any of the previous of the first embodiment, the second component comprises an oxide represented by the formula BO, or a hydroxide represented by the formula B(OH), where B is an alkali earth metal or transition metal. B may be sodium, potassium, magnesium, calcium, zinc, barium, aluminum, yttrium, a lanthanide, zirconium, iron, bismuth or manganese. The second component may be an oxide or hydroxide of: magnesium, barium calcium, zinc, iron(II), manganese (II), or mixtures thereof.

In combination with any of the previous of the first embodiment, the second component is magnesium brine having a pH of about 9 to about 11, or about 10 to 11, wherein the magnesium brine contains an effective amount of magnesium hydroxide. The magnesium hydroxide may be characterized by having a hexagonal platelet morphology. The magnesium brine may further contain an effective amount of magnesium hydroxide, magnesium chloride, magnesium sulphate, magnesium oxychloride precursor, magnesium oxysulphate precursor, or mixtures thereof.

In combination with any of the previous aspects of the first embodiment, the second component comprises particulate matter having an average minimum surface area of greater than 5 m$^2$/g. In combination with any of the previous aspects of the first embodiment, the second component further comprises wollastonite, talc, fly ash, kaolin clay, kaolinite, meta kaolin, mullite, calcium aluminate minerals, calcium silicate minerals, aluminum silicate minerals, calcium aluminum silicate minerals, or mixtures thereof, in a weight ratio of between 1:0.05 to 1:6 of the second component.

In a seventh aspect of the first embodiment, the first component is mono potassium phosphate or its hydrate, and the second component is magnesium brine having a pH of about 9 to about 11, wherein the magnesium brine contains an effective amount of magnesium hydroxide.

In an eighth aspect of the first embodiment, the first component is mono potassium phosphate or its hydrate, and the second component is magnesium brine having a pH of about 9 to about 11, wherein the magnesium brine contains an effective amount of magnesium hydroxide, magnesium chloride, magnesium sulphate, magnesium oxychloride phosphate precursor, magnesium oxysulphate phosphate precursor, or mixtures thereof.

In a ninth aspect of the first embodiment, the first component comprises $Mg(H_2PO_4)_2$ or its hydrate, and the second component comprises an alkali metal oxide or alkali metal hydroxide.

In a tenth aspect of the first embodiment, the first component comprises $AlH_3(PO_4)_2$ or its hydrate, and the second component comprises an alkali metal oxide or alkali metal hydroxide.

In combination with any of the previous aspects of the first embodiment, the resultant reaction product is of reduced crystalline morphology or reduced nucleation centers. In combination with any of the previous aspects of the first embodiment, the first component or the second component has an average particle size of less than 50 micron.

In an eleventh aspect of the first embodiment, the second component is alkali earth metal oxy-chloride phosphate precursors, alkali earth metal oxy-sulfate phosphate precursors, or mixtures thereof.

In combination with any of the previous aspects of the first embodiment, the second component further comprises fillers wollastonite ($CaSiO_3$), talc ($Mg_3Si_4O_{10}(OH)_2$, mullite (alumino silicate), both Class C fly ash and Class F fly ash, the reactive filler present in a weight ratio of 1:0.5 to 1:6 to the second component. In combination with any of the previous aspects of the first embodiment, a product prepared by the process as defined in the first embodiment is provided.

In a second embodiment, an inorganic phosphate compound is provided. The compound is of the general formula: $B(A_{3-m}PO_4)_s$; wherein A has a valency of m=1 or 2; and B has a valency of s=1, or 2; $B(A_{(2/m)}PO_4)_s$; wherein A has a valency of m=1 or 2; B has a valency of s=1, or 2; $^{(2/m)}A_3B_m(PO_4)_2$; wherein A has a valency of m=1 or 2; B has a valency of 3; or $B(AOPO_4)_s$; wherein A has a valency of 4 and s=1 or 2; and B has a valency of 1, or 2; wherein the inorganic phosphate i-iv has at least one of the following characteristics: a substantially reduced amount of calcined alkali/alkali earth oxide particles present as measured b x-ray diffraction; or a reduced crystalline morphology as measured by x-ray diffraction relative to a compositionally similarly inorganic phosphate ceramic or; a reduced density, relative to a compositionally similarly inorganic phosphate ceramic.

In a first aspect of the second embodiment, the density of the inorganic phosphate is less than 1.8 g/cm$^3$ or less than 1.5 g/cm$^3$. In combination with any of the previous aspects of the second embodiment, the compound is $Na_2KPO_4$. $NaK_2PO_4$. $MgKPO_4$. $Mg(ZnPO_4)_2$. $Mg(K_2PO_4)_2$. $Mg_2KPO_4$. $Mg(ZnPO_4)_2$. $Mg(K_2PO_4)_2$. $AlK_3(PO_4)_2$. $Al_2Mg_3(PO_4)_2$. $ZrOKPO_4$. $Mg(ZrOPO_4)_2$. $Zr(OH)_2KPO_4$. Or $Mg[Zr(OH)_2PO_4)_2]_2$.

In a third embodiment, a method of producing an oxy phosphate-containing composition is provided, the method comprises: providing a first component comprising a solution of an oxy-phosphate of chemical formula $(MO)(H_2PO_4)_2$ and its hydrates, where M is an element of valency 4 and m=1-3, wherein the first component solution is adjusted to a pH between 2-5; providing a second component comprising a solution of an alkaline oxide or alkaline hydroxide represented by $B^{2m}O_m$ or $B(OH)_{2m}$ where B is an element of valency 2m (m=1, 1.5, or 2); and combining the first component and the second component together.

In a first aspect of the third embodiment, M is zirconium (IV). In a second aspect of the third embodiment, the pH is adjusted to between 2-5 or the pH is adjusted to between 3-4.5, or the pH is adjusted to between 3-3.5. In combination with any of the previous aspects of the third embodiment, the first component comprises magnesium oxychloride, magnesium oxysulfate, or mixtures thereof, in combination with an amount of hydrochloric acid or sulfuric acid to reduce the pH to between 2 to 5. In combination with any of the previous aspects of the third embodiment, a product prepared by the process as defined in the third embodiment is provided. In combination with any of the previous aspects of the third embodiment, the second component comprises zirconium compounds, zinc compounds, or mixtures present in an amount of between 0-5 wt. % of the second component.

In a forth embodiment, a method of producing berlinite is provided. The method comprises: providing a first component comprising aluminum trihydrogen phosphate $AlH_3(PO_4)_2$. or its hydrates; providing a second component comprising aluminum hydroxide; combining the first component and the second component together; and heating the combination at an elevated temperature sufficient to form a berlinite phase ($AlPO_4$) detectable by x-ray diffraction.

In a fifth embodiment, a method of producing a high-temperature resistant coating is provided. The method comprises: providing a first component comprising aluminum trihydrogen phosphate $AlH_3(PO_4)_2$. or its hydrates; providing a second component comprising aluminum hydroxide; combining the first component and the second component together; and contacting a surface of an article with the combination of the first component and the second component; heating the surface of the article at an elevated temperature sufficient to form a coating comprising a berlinite phase ($AlPO_4$) detectable by x-ray diffraction.

In a sixth embodiment, a method of producing aluminum trihydrogen phosphate ($AlH_3(PO_4)_2$. or its hydrates is provided. The method comprises heating a solution comprising at least one of aluminum oxide or aluminum hydroxide or aluminum oxide hydrate, and phosphoric acid to an elevated temperature for a time sufficient to dissolve to a maximum amount the at least one of aluminum oxide or aluminum hydroxide or aluminum oxide hydrate; and cooling to form a viscous solution.

In a first aspect of the sixth embodiment, the method further comprises adding about 0.5 wt. % to about 2 wt. % of a source of fluoride ion to the solution. In combination with the previous aspect of the sixth embodiment, the method further comprising adding about 0.2 wt. % to about 1 wt. % of an oxidizer to the solution. In combination with any of the previous aspects of the sixth embodiment, the oxidizer is selected from potassium permanganate, potassium chromate, sodium chromate, a soluble nitrate of potassium, magnesium, or aluminum. In combination with any of the previous aspects of the sixth embodiment, the method further comprises combining with the viscous solution at least one of magnesium brine, magnesium hydroxide or magnesium oxide to form a reactive mixture; and applying the reactive mixture on a substrate.

In a seventh embodiment, an atomizable phosphate ceramic composition is provided. The atomizable phosphate ceramic composition comprising a first component comprising an aqueous solution of an acid-phosphate of chemical formula Am(H2PO4)m.nH2O, where A is hydrogen ion, ammonium cation, metal cation, or mixtures thereof; where m=1-3, and n=0-6; the first component solution adjusted to a pH of about 2 to about 5; a second component comprising an aqueous solution of an alkaline oxide or alkaline hydroxide represented by B2mOm, B(OH)2m, or mixtures thereof, where B is an element of valency 2m (m=1, 1.5, or 2) the second component solution adjusted to a pH of between 9-14; and a rheology modifier/suspending agent in an amount capable of providing shear thinning of either the first component or the second component and further capable of suspending a high solids content of either the first component or the second component for atomization. Optionally, aggregate material is present in an amount in at least one of the first and the second component capable of imparting an observable color and/or texture. The first component can comprise mono potassium phosphate or its hydrate, in combination with one or more of phosphoric acid or aluminum trihydrogen phosphate or its hydrate such that the pH of the solution is between 2-5. The first component can comprise mono calcium phosphate or its hydrate. The first component, A can be sodium, potassium, cesium, iron (II), iron (III), magnesium (II), zinc (II), aluminum (III), bismuth (III), zirconium (IV) or mixtures thereof. The first component preferably comprises phosphoric acid, alkali metal dihydrogen phosphate MH2PO4, alkali earth dihydrogen phosphate M(H2PO4)2 or its hydrate, transition metal trihydrogen phosphate MH3(PO4)2 or its hydrate, or mixtures thereof. The second component can be an oxide represented by the formula BO, or a hydroxide represented by the formula B(OH)2, where B is an alkali earth metal or transition metal, wherein B is sodium, potassium, magnesium, calcium, zinc, barium, aluminum, yttrium, a lanthanide, zirconium, iron, bismuth or manganese. The second component can be an oxide or hydroxide of magnesium, barium calcium, zinc, iron(II), manganese(II), or mixtures thereof. The second component can be magnesium brine having a pH of about 9 to about 11. The phosphate ceramic spray composition can further comprise aluminum oxide present in an amount sufficient to increase the hardness of the phosphate ceramic. Solids content of up to about 75 wt % for either the first or second component can be used.

In combination with any of the previous aspects of the seventh embodiment, the rheology modifier/suspending agent is at least one of guar gum, diutan gum, welan gum, and xanthan gum. In combination with any of the previous aspects of the seventh embodiment, the aggregate is present in an amount of at least about 1 wt % to about 60 wt %. In combination with any of the previous aspects of the seventh embodiment, the aggregate is at least one of a resin coated silica and a naturally colored mineral aggregate. The aggregate can be of an average particle size of about 20 mesh micron to about 400 mesh. In combination with any of the previous aspects of the seventh embodiment, the aggregate is of an average particle size of at least about 20 mesh or less and, after application of a coating of less than about 20 mil, the sprayed phosphate ceramic coating substantially retains the aggregate in the coating on a vertical surface or an overhead surface.

In an eighth embodiment, a method of atomizing a phosphate ceramic, the method comprising providing (i) a first component comprising an aqueous solution of an acid-phosphate of chemical formula Am(H2PO4)m.nH2O, where A is hydrogen ion, ammonium cation, metal cation, or mixtures thereof; where m=1-3, and n=0-6; the first component solution adjusted to a pH of about 2 to about 5; and (ii) a second component comprising an aqueous solution of an alkaline oxide or alkaline hydroxide represented by B2mOm, B(OH)2m, or mixtures thereof, where B is an element of valency 2m (m=1, 1.5, or 2) the second component solution adjusted to a pH of between 9-14; wherein the second component is separated from the first component prior to atomization; (iii) a rheology modifier/suspending agent in an amount capable of providing shear thinning of either the first component or the second component prior to exiting the dispensing device and further capable of suspending a high solids content of either that results in a decrease in the viscosity of the composition the first component or the second component for atomization; and atomizing the first component and second component. The first and second components can be as described above for the seventh embodiment. Optionally, aggregate material can be present in an amount in at least one of the first and the second component capable of imparting an observable color and/or texture. In one aspect, the step of atomizing comprises urging the first component and the second component through an atomizing orifice using at least one of a multi-channel pump, a plural piston pump, peristaltic pump, a ram discharge extruder, and a progressive cavity pump.

In combination with any of the previous aspects of the eighth embodiment, the step of atomizing further comprises a mixer configured to mix the first component, the second component, and the aggregate. In combination with any of the previous aspects of the eighth embodiment, the step of atomizing comprises dispensing the first and second components essentially simultaneously. In combination with any of the previous aspects of the eighth embodiment, the rheology modifier/suspending agent is at least one of guar gum, diutan gum, welan gum, and xanthan gum.

In combination with any of the previous aspects of the eighth embodiment, the aggregate is present in an amount of at least about 1 wt % to about 60 wt %. The aggregate can be of an average particle size of about 20 mesh to about 400 mesh. The aggregate can be at least one of an aggregate colorant comprising a naturally colored mineral aggregate and an aggregate colorant comprising resin coated silica. In combination with any of the previous aspects of the eighth embodiment, the aggregate is of an average particle size providing surface texture to the spray composition after application. In combination with any of the previous aspects of the eighth embodiment, the method further comprises the step of forming a coating of less than about 20 mil thickness and retaining the aggregate in the coating when applied to a vertical surface or overhead surface, wherein the aggregate is at least 400 mesh.

BRIEF DESCRIPTION OF THE DRAWINGS

An understanding of the aspects disclosed and described herein, summarized above, may be had by reference to the appended drawings, some of which illustrate the results obtained from the examples set out below. Accordingly, FIG. 1. Depicts an X-ray diffraction pattern of a thin coating (blue) and thick coating of magnesium potassium phosphate composition as disclosed and described herein.

DETAILED DESCRIPTION

Figure 1:
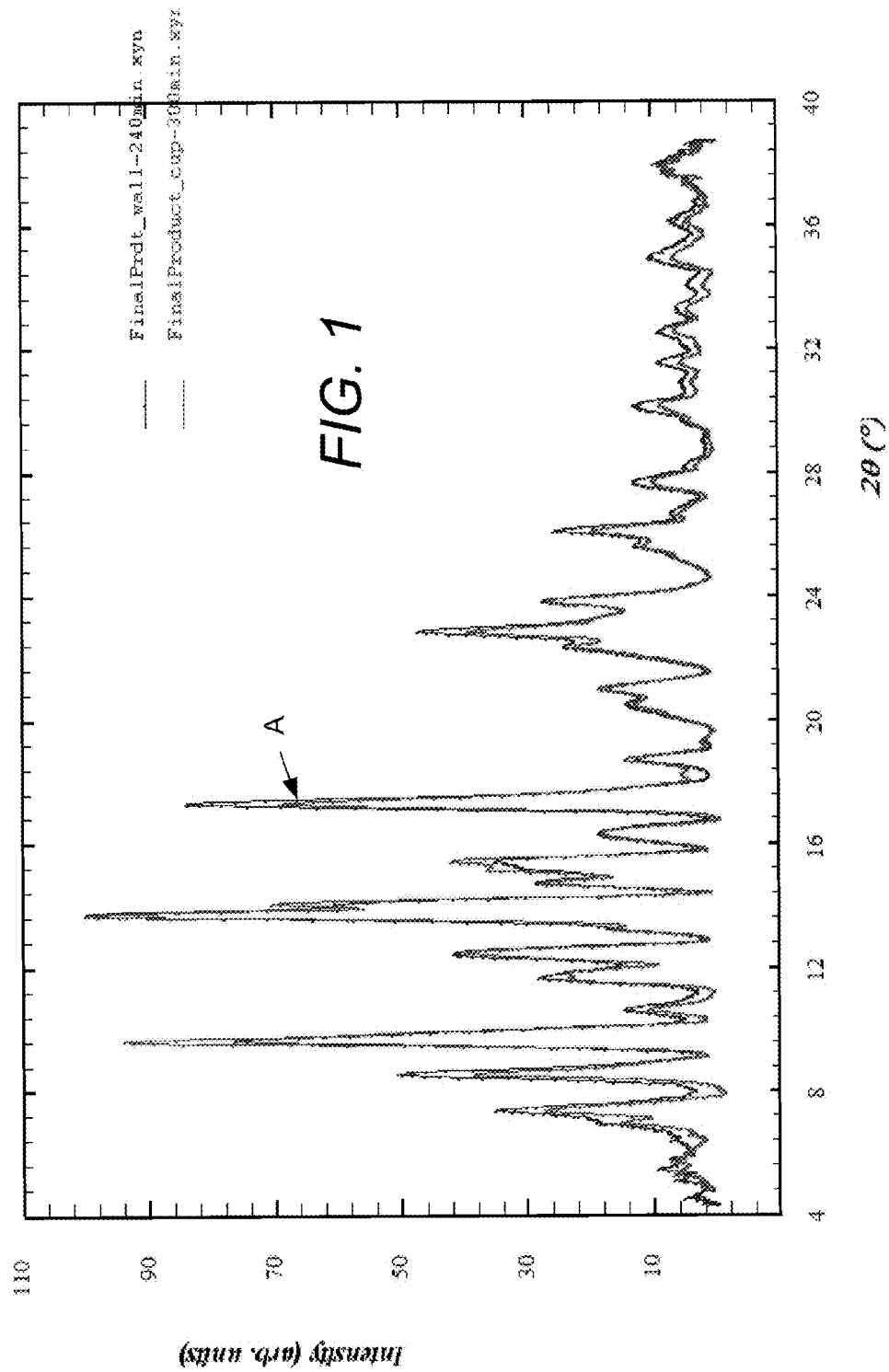

In various aspects, a multi-component formulation is provided, comprising at least one acidic component and at least one alkaline component. Both components of the multi-component formulation are provided as solutions, emulsions, dispersions, pastes, or combinations thereof. Each of the components are produced separately and stored separately, and may be dispensed separately or in combination. The components ultimately are combined prior to or during application and are allowed to react to form an inorganic phosphate composition.

The resultant reaction products of the multi-component formulation are near neutral in pH and may provide refractory-like compositions that are stable at very high temperature, for example, exceeding 2000° F., e.g., temperatures where most of the commercial organic-based products and some inorganic produces can not survive.

In another embodiment, the above formulations are provided as suitable coatings and/or paints and are formulated for high solids spray coating. Up until now, it has been difficult to spray a suspension of ceramic precursor solutions with high solids content and obtain a coating that is smooth or does not result in the migration of the aggregates (or the substantial retention of the aggregates in the coating) after application to a surface. Indeed, the same can be said of conventional spray coating of hydraulic cements. Using spray equipment with aggregate-containing formulations as conventional paint/coating formulations has been problematic for a number of reasons, some of which include the difficulty of passing larger-sized aggregates through small orifices of spray equipment and even more so, the difficulty of keeping such aggregates from migrating once they are sprayed on a surface. Likewise, the ability to atomize such aggregate-containing formulations and obtaining acceptable coated surfaces has been elusive. Decreasing the set time of the formulation provides only a partial solution to this problem and is generally inapplicable for conventional paints.

Applicants have thus provided ceramic formulations that are capable of spray coating, as well as capable of atomization so as to provide a "paint-like" appearance. In fact, it is difficult to distinguish the instant set coatings from a conventional paint coatings on a surface. Like conventional paints, the instant formulations can be directly sprayed on surfaces, e.g., metal surfaces, concrete surfaces, and other structural surfaces, but in contrast, the instant formulations provide functional, value-added properties at a level not possible from conventional paints, such as metal corrosion protection and fire resistance.

By a combination of rheology control and dispersion of the solids in the formulation components (parts A and B), paint-like final coatings of ceramics are provided using conventional spray equipment. It is further been demonstrated that aggregate colorants can be effectively incorporated into the already high-solids formulation components so as to provide colored coatings. It has also been demonstrated to provide textured surfaces of the instant formulations using aggregates of larger size, e.g., sand. Using a rheology modifier/suspending agent in an amount capable of providing shear thinning of either the first component or the second component and further capable of suspending a high solids content of either the first component or the second component for atomization, excellent paint-like coatings are obtained.

Addition of aggregates to the high solids components of the instant disclosure is believed possible because the of the adjusted viscosity of the components, their density, and their ability to set rapidly (to provide at least a mechanical hold of the aggregate). Conventional paints and most hydraulic cements simply cannot hold aggregate of large size (either for coloring or texturing) because of at least their inability to set quickly. As a result, the instant formulations differ from these conventional coatings in that they can provide a range of coatings, for example, from a Venetian sand plaster finish, to a brightly colored satin-finish-like coating not otherwise obtainable from conventional hydraulic cements or conventional paints.

In one aspect, a sprayable ceramic coating comprises a first component and a second component, a suspension agent, aggregates of particle size of less than about 30 mesh, and a rheology modifier.

First Component—Acid Phosphate Precursor Material

Acidic phosphate component: The acidic phosphate component consists of phosphoric acid and/or an acid-phosphate of formula, $A^m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 (FeO and $Fe_2O_3$ as oxides), A can be the metal of lower oxidation state. It can also be a cation of oxides of four-valent metal oxide such as $ZrO^{2+}$, in which case m=2 $nH_2O$ in the formula above is simply the bound water, where n can be any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate $(Mg(H_2PO_4)_2)$ or aluminum trihydrogen phosphate $(AlH_3(PO_4)_2)$ by neutralizing partially using an alkaline oxide, hydroxide, or a mineral, or by acidifying a dihydrogen phosphate such as mono potassium phosphate $(KH_2PO_4)$ that has a pH greater than 3.5 by adding a small but appropriate amount of phosphoric acid or a low pH acid phosphate such as $Mg(H_2PO_4)_2$ or aluminum trihydrogen phosphate $AlH_3(PO_4)_2$. Examples described later in this document provide the art of adjusting this pH.

Often the acid-phosphate used in the precursor is only partially soluble. In such a case, the precursor is milled so that the average particle size passes through 230 mesh sieve (less than 70 micron).

For oxychloride and oxysulfate compositions, the acidic component consists of magnesium oxychloride, and magnesium oxysulfates appropriately acidified with either hydrochloric acid or sulfuric acid to reduce the pH.

Water may be added to the precursor component to reduce the viscosity thereof, or other types of viscosity reducing agents may be used. Commercial additives that prevent algae growth may also be added to this precursor so that no algae growth occurs during storage of this precursor.

Second Component—Base Oxide/Hydroxide Precursor Material

Basic precursor: The basic precursor generally consists of a sparsely soluble oxide, or preferably a hydroxide with an average particle size less than 70 micron. The oxide may be represented by the formula $B^{2m}O_m$ or $B(OH)_{2m}$, where B is a 2m-valent metal. All divalent metal oxides (m=1), and some trivalent metal oxides in reduced state fall into this category of sparsely soluble oxides. Examples of divalent oxides are, but not limited to, magnesium, barium, zinc, calcium. Examples of trivalent oxides in reduced state are iron oxide (FeO), and manganese oxide (MnO).

For paints, coatings, adhesives and seals, it is desirable to obtain at least some amorphous or glassy phase in the coating, so that this phase will fill the surface irregularities of the substrate and form into an impermeable, dense, and smooth coating. It has been discovered that it is possible to develop such structure by using magnesium hydroxide $(Mg(OH)_2)$ instead of calcined MgO. $Mg(OH)_2$ reacts with an acid-phosphate instantly resulting in two favorable consequences. First, the crystalline growth cannot occur due to very short time of reaction. Secondly, since the solubility of $Mg(OH)_2$ is much higher than that of calcined MgO, most of it dissolves and hence there will not be many nucleation centers for any crystalline growth of the reaction product. The net result is a greater amorphous structure.

By using uncalcined oxide powders it was previously difficult to carry out the methods of producing acid-base ceramics suitable for spray coating in conventional spray equipment and for providing colored or smooth finishes. Ceramics typically need crystalline structure for three dimensional stability and rigidity. In contrast, non-ceramic coatings typically attach to a substrate and get two dimensional rigidity from the substrate. For at least this reason, use of uncalcined oxides or hydroxides are herein disclosed and described as basic precursors produce substantially reduced crystalline inorganic phosphate compositions useful as coatings and also useful for sprayable coatings. In one aspect, the use of uncalcined oxides or hydroxides as basic precursors to produce substantially reduced crystalline inorganic phosphate compositions as herein disclosed and described provides a major distinction and a substantial improvement over conventional phosphate ceramics. On the other hand, the use of calcined oxides can provide for improved coloring of the set coating over the uncalcined oxides or hydroxides.

Calcining oxides is a major source of energy consumption in acid-base cements and coatings. This can be eliminated by using uncalcined oxides and hydroxides. For example, in one aspect a brine of $Mg(OH)_2$ obtained directly from magnesia mines provides for a suitable source of the first component alone or in combination with other basic minerals or filler. The brine contains at least about 60% dissolved, suspended or dispersed $Mg(OH)_2$ and can be used directly to provide the second alkaline component of the inorganic phosphate composition.

The Inorganic Phosphate Composition

In at least one aspect, a two part component system is provide, one part is an acidic phosphate precursor component whose pH lies between 2-5, 2.5-4.5 in a preferred range, and 3-4.5 range in the most preferred range. A basic precursor component having a pH range from 9-14, a preferred range of 10.5-12, and 11-12 in the most preferred range.

When divalent metal oxide is used, the acid-base reaction that forms the inorganic phosphate composition is given by equation (1):

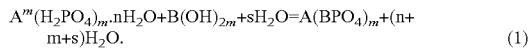

$$A^m(H_2PO_4)_m \cdot nH_2O + B(OH)_{2m} + sH_2O = A(BPO_4)_m + (n+m+s)H_2O. \quad (1)$$

The first compound on the right hand side of Eq. (1) is the acid phosphate precursor material, which may be a hydrate. The second compound is the base precursor material, which may also be a hydrate. For example, mono potassium phosphate ($KH_2PO_4$) as the acid phosphate and magnesium hydroxide as the alkaline material, provides A=K, m=1, and B=Mg, and n=0, which results in the following equation for the acid base equation (2).

$$KH_2PO_4 + Mg(OH)_2 + 4H_2O = MgKPO_4 \cdot 6H_2O \quad (2)$$

While similar reactions have been used in producing ceramics of $MgKPO_4 \cdot 6H_2O$, (see for example, Chemically Bonded Phosphate Ceramics, by Arun Wagh, Elsevier pub., 2004), such cements were made using calcined magnesium oxide, in contrast to a liquid, paste, dispersion or emulsion source of magnesium hydroxide. Thus, while the same chemical formula is theoretically prepared, the inorganic phosphate disclosed and described herein is substantially more amorphous (reduced crystallinity) than previously prepared $MgKPO_4 \cdot 6H_2O$.

Moreover, in at least one aspect, it has been discovered that when the acidic phosphate precursor component has an element with a valency of m, where m is greater than 1, for example, $Mg(H_2PO_4)_2$ (m=2), oxides or hydroxides of an alkali metal, such as that of Na or K in the base precursor material may be used as a paste, dispersion or emulsion. The acid-base reaction that produces the inorganic phosphate composition for the example discussed above is given by equation (3):

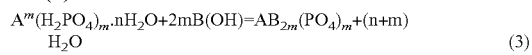

$$A^m(H_2PO_4)_m \cdot nH_2O + 2mB(OH) = AB_{2m}(PO_4)_m + (n+m)H_2O \quad (3)$$

The resultant water fraction evaporates providing the inorganic phosphate composition. $Mg(OH)_2$ may be used as a very fine powder passing—less than 70 micron (mesh 230-235). It may be reacted with an acid-phosphate that exhibits a pH greater than 3. For example, one may use mono potassium phosphate solution, whose pH is 4.2, and bring down its pH by adding small amount of phosphoric acid or a di hydrogen phosphate of very low pH, such as aluminum di-hydrogen phosphate ($AH_3(PO_4)_2 \cdot nH_2O$)., whose pH is approximately 1.2. Use of $Mg(OH)_2$ reduces the energy consumption in the life cycle cost of the product and hence also reduces green house gas release in the entire process. As discussed above, it is possible to raise the pH of alkaline component to dissolve more hydroxide to very high pH, and if needed, one can go to the maximum pH of 14. However, handling of such very alkaline products is difficult, and therefore a maximum pH of 11 is recommended. As discussed below, magnesium brine, which has a pH of about 10.2, works very well.

Once the acid and alkaline solutions are optimized for their solubility, pH, and optionally viscosity, the inorganic phosphate composition is formed by combining the first and second precursor components. Suitability and proportion of these components and their compatibility is governed by the stoichiometry of the acid-base reaction. Table 1 summarizes these combinations, and the chemical formulae for the resulting inorganic phosphate compositions.

In Table 1, the water, which is either added to initiate the reaction, or is the water formed during reaction, may be present as free or bound water. Table 1 does not distinguish between the two, but that distinction is of little consequence because the free water will evaporate when the product is dried, but the bound water will remain in the structure. Amount of the bound water may be estimated by using conventional analytical tools and techniques, such as differential scanning calorimetry, for example.

TABLE 1

Summary of acid-base reactions that can occur in forming the inorganic phosphate composition products

| Components | General equations | Examples |
|---|---|---|
| Monovalent and divalent metal oxides, and monovalent and divalent metal phosphates | $sA^m_{(3-m)}O + B^s(H_2PO_4)_s = B(A_{3-m}PO_4)_s + sH_2O$<br>A has a valency of m = 1 or 2.<br>B has a valency of s = 1, or 2. | m = 1, s = 1<br>$Na_2O + KH_2PO_4 \rightarrow Na_2KPO_4 + H_2O$<br>m = 2, s = 1<br>$MgO + KH_2PO_4 \rightarrow MgKPO_4 + H_2O$<br>m = 2, s = 2<br>$2ZnO + Mg(H_2PO_4)_2 = Mg(ZnPO_4)_2 + 2H_2O$<br>m = 1, s = 2<br>$2K_2O + Mg(H_2PO_4)_2 \rightarrow Mg(K_2PO_4)_2 + 2H_2O$ |

TABLE 1-continued

Summary of acid-base reactions that can occur in forming the inorganic phosphate composition products

| Components | General equations | Examples |
|---|---|---|
| Monovalent and divalent metal hydroxides, and monovalent and divalent metal phosphates | $(2s/m)A^m(OH)_m + B^s(H_2PO_4)_s = B(A_{(2/m)}PO_4)_s + 2sH_2O$<br>A has a valency of $m = 1$ or 2.<br>B has a valency of $s = 1$, or 2. | $m = 1, s = 1$<br>$2NaOH + KH_2PO_4 \rightarrow Na_2KPO_4 + 2H_2O$<br>$m = 2, s = 1$<br>$Mg(OH)_2 + KH_2PO_4 \rightarrow MgKPO_4 + 2H_2O$<br>$m = 2, s = 2$<br>$2Zn(OH)_2 + Mg(H_2PO_4)_2 \rightarrow Mg(ZnPO_4)_2 + 4H_2O$<br>$m = 1, s = 2$<br>$2KOH + Mg(H_2PO_4)_2 \rightarrow Mg(K_2PO_4)_2 + 4H_2O$ |
| Monovalent and divalent metal oxides, and trivalent metal phosphates | $3A^m{}_{(2/m)}O + 2B^3H_3(PO_4)_2 = (2/m)A_3B_m(PO_4)_2 + 3H_2O$<br>A has a valency of $m = 1$ or 2; B has a valency of 3; | $m = 1$<br>$3K_2O + 2AlH_3(PO_4)_s \rightarrow 2AlK_3(PO_4)_2 + 3H_2O$<br>$m = 2$<br>$3MgO + AlH_3(PO_4)_s \rightarrow Al_2Mg_3(PO_4)_2 + 3H_2O$ |
| Quadrivalent metal oxides or hydroxides, and divalent metal phosphates | Quadrivalent oxides<br>$sAO_2 + B^s(H_2PO_4)_s = B(AOPO_4)_s + sH_2O$<br>A has a valency of 4; B has a valency of 1 or 2; and $s = 1$ or 2.<br>Quadrivalent oxides<br>$sA(OH)_4 + B(H_2PO_4)_s = B[AOH)_2PO_4]_s + 2sH_2O$<br>A has a valency of 4; B has a valency of 1 or 2; and $s = 1$ or 2. | $S = 1$<br>$ZrO_2 + KH_2PO_4 \rightarrow ZrOKPO_4 + H_2O$<br>$S = 2$<br>$2ZrO_2 + Mg(H_2PO_4)_2 \rightarrow Mg(ZrOPO_4)_2 + 2H_2O$<br>$S = 1$<br>$Zr(OH)_4 + KH_2PO_4 \rightarrow Zr(OH)_2KPO_4 + 2H_2O$<br>$S = 2$<br>$2Zr(OH)_4 + Mg(H_2PO_4)_2 \rightarrow Mg[Zr(OH)_2PO_4)_2]_2 + 4H_2O$ |

In Table 1, examples of monovalent elements are sodium (Na), potassium (K), or ammonium ($NH_4$). Similarly, major divalent elements one may use are magnesium, calcium, zinc, barium etc., while trivalent elements are aluminum, iron etc., and an example of quadrivalent element is zirconium (Zr). Other elements may be used that fit into the combinations given above and the disclosure and claims are should not to be limited by the examples given above.

Though the stoichiometry dictates the composition of the adhesive, it is not possible to exactly tailor that composition in a production process. Typically, the basic oxide and hydroxide precursor content is kept at a stoichiometric higher amount compared to the acid-phosphate precursor content. This provides a product that is substantially free of any residual acid.

Coatings and Paints

Cements and ceramics may generally be produced by using acidic phosphate and oxides and oxide minerals. These cements and ceramics are typically formed by mixing an acid-phosphate and the solid oxide in water. This mixture is used immediately and ultimately sets into a solid product within hours. These formulations of precursors and the overall process, however, is not useful for producing formulations suitable for dispensing, for example, as thin film coatings and the like. At least some of the reasons for this include, for example: such compositions are rapid-setting cements containing particulate matter; and maximum working times after combining and before setting is only couple of hours. Thus, they do not have a shelf life needed for paints and coatings. To produce a smooth, thin coating, it is typically necessary to use very fine particles as components. Generally, this is not a requirement in 3-D cement forming and ceramic fields. In fact, finer particles increase the surface area of exposure to acid-base reactions. For example, it has been disclosed that the limits on the surface area may be 0.3-0.55 $m^2/g$, which is a very small range and not generally suitable for certain applications, including for example, coatings. It has further been disclosed that the maximum allowable surface area of 0.55 $m^2/g$ is also too small for certain applications, including for example, coatings. Paints and coatings, for example, typically require much finer particles with large surface area, for example, greater than about 5 $m^2/g$, more preferably greater than about 10 $m^2/g$ for instant reaction and smoothness of the applied coating surface.

During setting of conventional acid-base phosphate cements, an exothermic acid-base reaction releases heat and heats the reacting mixture, which may help setting. For thin coatings, a significant amount of this exothermic heat is dissipated due to the large surface area of a relatively thin coat. In particular, in spray coating, which is the most efficient way of coating large areas, the acid-base precursor media is atomized; the atomization cools the media by several degrees which inhibits the acid-base reaction on the surface of the substrate. This leads to dripping (or rebound) of unreacted media from vertical/overhead surface such as walls/ceilings, and also gives efflorescence on the dried surface. For this reason, the compositions of paints and coatings need to be tailored to instant reaction that produces higher amount of exothermic heat that will harden the sprayed product. This is another reason, why large surface area of particles is needed for conventional cements.

Conventional paints and coatings are generally organic polymers and they are typically non crystalline, amorphous materials upon use. On the other hand, acid-base phosphate cements or ceramics, discussed above, consist of crystalline or glass-crystalline materials with a significant crystalline phase after setting. As a result, conventional acid-base phosphate ceramics are not generally suited for coatings, paints, and adhesives, for example, in view of their significant crystal structure that otherwise provides an undesirable grainy structure. What has been discovered and disclosed herein is a substantially reduced crystalline inorganic phosphate composition suitable for thin film coatings, paints, and adhesives. It has been discovered that by changing the precursor materials to provide solutions, dispersions, emulsions, and/or pastes, substantially reduced crystalline inorganic phosphate compositions can be produced.

In addition, even with conventional precursor starting materials and a high solids loading up to 75 wt. % solids of either precursor component, by a combination of rheology control and dispersion of the solids in the formulation components (parts A and B), paint-like final coatings of ceramics are provided using conventional spray equipment. It is further been demonstrated that aggregate colorants can be effectively incorporated into the already high-solids formulation components so as to provide colored coatings. It has also been demonstrated to provide textured surfaces of the instant formulations using aggregates of larger size, e.g., sand.

Dispensing of the components may be done using conventional dispensing equipment, such as for example, a dual source extruder, rams, pumps etc. fitted with a suitable spray gun, optionally with an in-line static mixer. In one aspect, the spray equipment excludes texture guns as they typically are used for hydraulic cement dispensing/sputtering.

In at least one aspect, a multi-component formulation is disclosed and described that provides at least one or more of the following properties prior to combining the respective components, or after combining: providing viscosities of the individual components less than about 35,000 centipoise in general, preferably less than about 15,000 centipoise; bonding/adhering to a substrate, the individual components when dispensed, or within a short time thereafter so that they are not adversely affected by exposure to different atmospheric conditions such as rain, sun, and wind; bonding to the substrate a hard and dense set coating that meets standards designed for a particular application such as fire protection, corrosion resistance, chemical resistance, architectural appeal, etc.; exhibit long term durability against the entire solar spectrum, and heat and cooling cycles for the set coating; providing a pH greater than about 2 for the acidic phosphate precursor component and a pH of less than about 12 for the basic precursor component to avoid occupational hazard and to protect environments during any use, disposal or spill; providing essentially homogeneous components during storage, and segregation of water not occurring during pumping and storage. If segregation does occur during storage and transport, the components can be re-mixed easily prior to application back into a homogenous state; minimizing the tendency of the basic precursor to harden by pozzalinic reaction during storage for at least six months; and/or preventing bioactivity of the acidic precursor.

The coatings prepared as disclosed here are durable, are not deteriorated by ultra violet radiation, and certain formulations are reflective to infra red radiation and, hence, support energy conservation in a building. The disclosed compositions are suitable for primers and top coats as they provide excellent bonding to a variety of substrates.

Dispensing of the Inorganic Phosphate Composition

Because the acid-base reactions that produce paints, coatings, or adhesives are instantaneous, a suitable applicator system is needed. A plural system, in which the acid and base precursor materials can be stored separately in the proportion desired, and then can be dispensed. For example, the inorganic phosphate composition precursors can be introduced in a mixing chamber during application or mixed upon exiting a spray device. Such systems are common in the market, and can be adapted for dispensing acidic and/or alkaline components without deteriorating the inner surface or components of the device.

Viscosity of the Precursor Components

The viscosity of the two components should be sufficiently low so that dispensing is facilitated. Generally, either precursor viscosity of less than 35,000 centipoise (cp) or less is acceptable for many pumps, but a viscosity of less than 15,000 cp is preferable.

For acid component, this is not an issue as most acid-phosphates exhibit low viscosity. Mono sodium phosphate being highly soluble, it meets this requirement easily. Mono potassium phosphate has a low solubility (20 g/100 ml) and much of the phosphate remains in suspension. Therefore, its viscosity needs to be lowered. This may be done by milling the solution of mono potassium phosphate solution. Other exemplary acid-phosphates, such as magnesium dihydrogen phosphate ($Mg(H_2PO_4)_2$), or aluminum tri hydrogen phosphate ($AlH_3(PO_4)_2$) also have low solubility and hence may also need to be milled to produce low viscosity precursor components. Generally, addition of excess water is not desirable, because it results in too much water in the final reacting mixture and setting of one or more of the components may occur.

For the alkaline component, the viscosity depends on the amount of powder material in the solution. The oxide powders or the mineral powders used in the solution have to be very fine in nature and are ground to pass −325 micron sieve size. Brine of $Mg(OH)_2$ is ideal for this purpose because it exhibits a low viscosity and hence no processing of brine is needed.

The viscosity of the second component (base precursor) may be adjusted by adding partially reactive minerals such as wollastonite (calcium silicate, $CaSiO_3$), or mineral containing materials such as fly ash. Class F fly ash is preferred because the small amount of carbon acts as a lubricant on particles and helps reduce the viscosity of the precursor components. The content of the additive may range from an amount equal to the second precursor component to twice that. If other oxides are used, the amount may be adjusted correspondingly to obtain a viscosity less than 15,000 cp.

In addition to the methods described above, viscosity may also be adjusted by adding commercial waterbourne paint conditioners in a small quantity, which can adjust (e.g., reduce) the viscosity as needed.

Shelf Life

As mentioned above, it is desirable that both the acidic and alkaline precursor components should have good shelf life, preferably greater than 6 months, greater than one year, or greater than 18 months. During this time, there should be insignificant segregation of particles and the liquid fraction, or, it should be easy to re-mix the components into a homogeneous or semi-homogenous mass suitable for dispensing at the time of application. This may be done, for example, by milling the acid component so as to produce a homogenous precursor and then optionally adding one or more commercial suspension agents, if necessary.

Obtaining a long shelf life for alkaline component is more difficult. This is because, alkaline oxide components tend to undergo pozzalinic reactions (reaction that occurs in Portland cement or in wet fly ash), in the presence of moisture such that the alkaline powder sets by itself into a hard mass resulting in difficulty reconstituting and/or grinding the hardened mass for use.

Generally the pozzalinic reaction is associated with calcium content in cement industry. Thus, limiting calcium content in the alkaline component can solve this problem. For example, using Class F fly ash, which has the least amount of free calcium, or limiting the amount of wollastonite, so that excess calcium is not released. Class C fly ash should generally be avoided in the alkaline composition because this ash contains very high proportion of free calcium. For the same reason, calcium hydroxide should generally be avoided as an oxide component in the second precursor component. In one aspect, an alkaline precursor component may comprise wollastonite and Class F fly ash in an amount not to exceed more than three times that of the Mg(OH)$_2$ or any oxide in the broadest range and two times in the specific range to provide a reasonably good shelf life.

Additives

The disclosed compositions optionally may include one or more additives, such as fillers surfactants (anionic or cationic, amphoteric, or nonionic), plasticizers, settling agents, rheology modifiers and/or suspending agents, and/or anti-foamers.

Suitable fillers include for example, wollastonite, talc, Class C or F fly ash, kaolin clay, kaolinite, meta kaolin, mullite, calcium aluminate minerals, calcium silicate minerals, aluminum silicate minerals, calcium aluminum silicate minerals, or mixtures thereof. Other fillers alone or in combination with the above may be used. In certain aspects, the weight ratio of the filler is between 1:0.05 to 1:6 to that of the second component. In certain aspects, the instant compositions can be essentially free of calcium silicates.

Suitable anionic surfactants include, for example, perfluorooctanoate (PFOA or PFO), perfluorooctanesulfonate (PFOS), sodium dodecyl sulfate (SDS), ammonium lauryl sulfate, alkyl sulfate salts, sodium lauryl ether sulfate (SLES), alkyl benzene sulfonate, and soaps or fatty acid salts. Suitable cationic surfactants include, for example, cetyl trimethylammonium bromide (CTAB), alkyl timethylammonium salt, cetylpyridinium chloride (CPC), polyethoxylated tallow amine (POEA), benzalkonium chloride (BAC), and benzethonium chloride (BZT). Suitable amphoteric surfactants include, for example, dodecyl betaine, cocamidopropyl betaine, and coco ampho glycinate. Suitable nonionic surfactants include, for example, alkyl poly(ethylene oxide), alkylphenol poly(ethylene oxide), poloxamers or poloxamines (copolymer of polyethylene oxide or polypropylene oxide), octyl glucoside, decyl maltoside, cetyl alcohol, oleyl alcohol, and dodecyl dimethylamine oxide. Other surfactants alone or in combination with the above may be used.

Suitable plasticizers include, for example phthalates, trimellitates, aliphatic dibasic esters, phosphates, epoxides, or polyesters. Specific examples of plastizers include, for example, DOP (di(2-ethylhexyl)phthalate, DINP (di(isononyl)phthalate, TOTM (tris (2-ethylhexyl)trimellitate, TINTM (tris(isononyl)trimellitate, DOA (di(2-ethylhexyl) adipate, DINA (di(isononyl)adipate, DOZ (di(2-ethylhexyl) azelate, and DOS (di(2-ethylhexyl)sebacate. Other plastizers alone or in combination with the above may be used.

Anti settling agents include, for example, soya-lacithin, aluminium stearate, stearate coated calcium carbonate, modified cater oil or fatty acids, dipentene, pine oil, methyl ethyl ketoxime, di-isobutylene-maleic dispersion, ammonium polyacrylate, modified soya lecithin emulsion, polycaprolactonepolyol-polyethyleneimine block copolymer, polycaprolactonepolyol-toluene diisocynate copolymer, polyhydroxystearic acid, and alkyd based anti settling agents. Other settling agents alone or in combination with the above may be used.

Suitable rheology modifiers/suspending agents include hydrated magnesium aluminum silicate, lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, for example, LOMAR D® dispersant (Cognis Inc., Cincinnati, Ohio), polyaspartates, oligomeric dispersants, polymethacrylate salts, guar gum, diutan gum, welan gum, xanthan gum and/or other agents that function as a rheology modifiers/suspending agent. It has been observed that certain rheology modifiers/suspending agents, for example, DARVAN (sodium polymethacrylate,) can provide only limited performance, e.g., providing smooth coatings at only about 15% of Al2O3 or other similar high density particles. Thus, the particular choice of rheology modifiers/suspending agent in not predicable for any particular phosphate ceramic formulation.

Anti-foamers include, for example, silicon based antifoam oil (siloxane with polyether terminal groups), acetylene glycol surfactants, and poly octyl acrylates. Other anti-foamers alone or in combination with the above may be used.

Eliminating Algae Growth in the Acidic Phosphate Precursor

Phosphates are nutrients for algae and hence one should expect algae growth in the acidic component. To avoid algae, one can add various commercial additives that inhibit any biological activity. One good example is cupric oxide. The addition of less than 1 wt. % of cupric oxide in the acidic phosphate precursor is sufficient to inhibit biological growth. Other commercial chemicals used to prevent algae or fungal growth may also be used.

Disclosed and described herein are novel inorganic two component precursor formulations comprising acid phosphates, oxychloride, and oxysulfate solutions and pastes, and a basic component comprising oxides and hydroxides, that can be brought together to react instantly so that the resulting product is an inorganic (oxychloro-) or (oxysulfo-)phosphate composition. Methods of producing the two acid and base components and their combinations, atomizable sprayable formulations, and optionally a substantially amorphous, reduced crystallinity ceramic are disclosed and characterized as set forth in the following selected examples, but the methods and claims are also applicable to other acid-base formulations with suitable modification of the components such as oxychloride and oxysulfate systems. A brief discussion on these modifications is provided, but that discussion is not intended to limit the claims or the disclosure itself.

EXAMPLES

Several examples, listed below, were conducted in order to formulate and demonstrate the attributes of the compositions disclosed herein.

Example 1

Magnesium Potassium Phosphate Composition

In this experiment, the first (acidic) component consisted of mono potassium phosphate (MKP) having a pH of about 4.2 when measured in aqueous solution. The MKP was milled for an hour prior to use to about 74 micron size powder (US 200 sieve). The MPK was then further milled for an hour and Its pH was adjusted between 3.2 and 3.5 by adding 2.5 wt. % phosphoric acid (added as 50% dilute solution). 0.5 wt. % cupric oxide was added to prevent algae growth. The solution was was adjusted with water to yield a viscosity of approximately 10,000 centipoise. The density of this component was 1.9 g/cm$^3$.

The second component (alkaline) was prepared as follows: A requisite amount of magnesium brine solution (Martin Marietta), as a source of magnesium hydroxide, was weighed into a mixer. Zr(OH)$_4$ powder was added to the brine and stirred for 5-10 min until homogenous. Wollastonite passing 325 mesh was added slowly to this solution and mixed for 10-15 min. An additional amount of water was added to adjust the viscosity to approximately 20,000 to 25,000 centipoise. The density of this liquid component was 1.25 g/cm$^3$ and the average particle size of particles in this solution was determined to be about 5.6 micrometers or less. Thus, the second component consisted of about 69 wt. % magnesium brine (providing about 61 wt. % Mg(OH)$_2$), about 8.7 wt. % wollastonite, about 2.2 wt. % zirconium hydroxide (Zr(OH)$_4$), the remainder water.

The two components were combined in the volume ratio of 1:1 for spray using a plural spray system. The two cartridges of the spray system were filled separately with the two components. The spray gun consisted of a mixing tube, in which the two components could be mixed prior to spraying. The composition was sprayed on different substrates e.g., steel, wood, hardboard, aluminum, concrete, mild steel Taber panels. The thickness coated was approximately 15-20 mil. Abrasion resistance measurements were made according to ASTM D 4060. The coatings were allowed to cure at ambient conditions for 7 days before all tests and sample analyses were done.

The resultant films of the inorganic phosphate composition disclosed herein were compared with commercial epoxy coating and a conventional inorganic phosphate concrete (Ceramicrete) coated on mild steel panels. The results of density, adhesion (pull out test, ASTM D4541), and abrasion resistance are summarized in Table 2 below.

TABLE 2

Test results on the magnesium potassium phosphate composition

| Coating system | Density (g/cm$^3$) | Adhesion resistance (psi) | Wear cycles/mil | Wear Index (wt. loss per cycle in micrograms) |
|---|---|---|---|---|
| MKP coating without colloidal silica | 1.4 | 334 | 423 | 118 |
| MKP with colloidal silica | 1.4 | 226 | 528 | 105 |
| Epoxy coating | 1.2 | 120 | 120 | 300 |
| CONTROL (Ceramicrete) | 1.8-2.0 | | | |

The results in Table 2 show that the density of the coatings is close to commercial organic coatings. Magnesium hydroxide has a lower density (2.38 g/cm$^3$) compared to the density of calcined magnesium oxide (periclase), which is 3.6 g/cm$^3$. For regular Ceramicrete (phosphate cement), produced from calcined magnesium oxide, the density is between 1.8 to 2 (g/cm$^3$) depending on the fillers used. Thus, regular Ceramicrete is heavier than the inorganic phosphate composition disclosed herein. In Ceramicrete, most calcined magnesium oxide remains unreacted as suspended or embedded particulate matter, which contributes to the density. In contrast, the density of the inorganic phosphate composition disclosed herein is less than that of Ceramicrete, which is believed due to more complete reaction of magnesium hydroxide source and the reduced amount of particulate magnesium oxides. As a result, the inorganic phosphate compositions disclosed and described herein result in lower density materials, for example, densities of about 1.4 g/cm$^3$, which are comparable to organic coatings. In contrast, densities of typical organic phosphate cements of similar composition prepared from periclase are between 1.8 to 2.0 g/cm$^3$.

Magnesium hydroxide has a hexagonal platelet or sheet structure that is structurally and morphologically different from calcined magnesium oxide (periclase) that has a cubic structure. In addition to lower density inorganic phosphate compositions, it is believed that the sheet structure of magnesium hydroxide resultant inorganic phosphate compositions derived therefrom provide smoother coatings and superior abrasion resistance compared to coatings prepared from calcined magnesium oxide derived inorganic phosphates. The average particle size difference of the resultant inorganic phosphate compositions derived from magnesium hydroxide (greater than 5 m$^2$/g) as disclosed and described herein also contributes to the superior abrasion resistance and smoothness of the coatings verses those of calcined magnesium oxide (less than 0.55 m$^2$/g).

The data in Table 2 also demonstrates that the inorganic phosphate composition disclosed herein is far superior to the epoxy coatings. For example, the inorganic phosphate composition has an adhesion resistance two to three times that of commercial epoxy coating, wear test results are about one fourth that of epoxy, and wear index, which represents wear loss, is about one third that of epoxy coating. Thus, the inorganic phosphate compositions disclosed herein are far superior to some commercial coatings available in the market.

Figure 2:
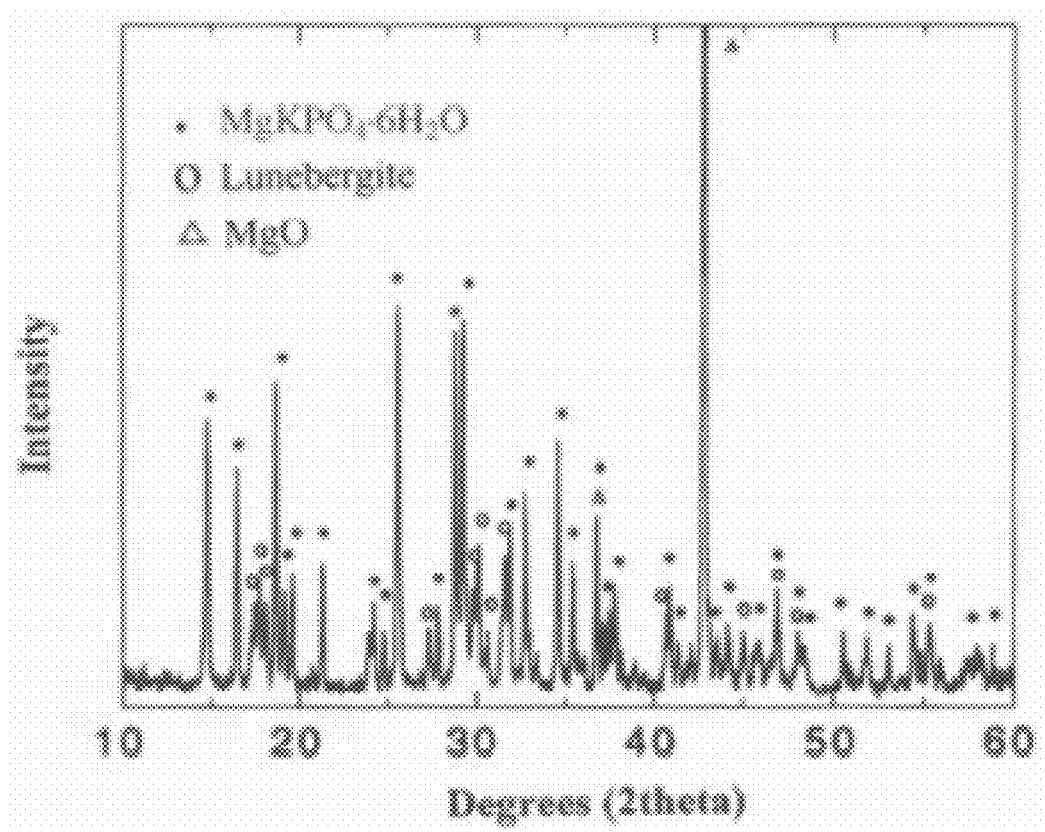
FIG. 2. Depicts an X-ray diffraction pattern of a conventional Ceramicrete (a phosphate cement).

Powder X-Ray Diffraction Comparison of the Organic Phosphate Composition Disclosed Herein with Conventional Phosphate Concrete FIG. 1 below shows the X-ray diffraction patterns of two identical samples prepared as described in Example 1, one sprayed as a thin coat and the other sprayed as a thick coat (marked as "A"). Both coatings exhibit exactly the same pattern, indicates that the coating formulation as in Example 1 may be used either as thin or thick coating. The main peaks of FIG. 1 represent CaSiO$_3$, Mg(OH)$_2$ and MgKPO$_4$.6H$_2$O. Each peak, however, is broadened. Breadth of an x-ray diffraction peak is indicative of amorphous or microcrystalline phases. For comparison, the X-ray diffraction pattern of Ceramicrete, a chemically similar phosphate cement produced by calcined magnesium oxide, is reproduced in FIG. 2 overlaid with that of a sample Example 1. The data shows the corresponding peaks of the sample from Example 1 are broader than in Ceramicrete, which indicates that the amorphous content (reduced crystallinity) inorganic phosphate composition disclosed herein is substantially higher than in Ceramicrete. The data in FIG. 2 also shows that in the Ceramicrete, the calcined magnesium oxide peak is substantially larger than that of the inorganic phosphate composition disclosed herein, which indicates that a significant amount of magnesium oxide remains unreacted or in macrocrystalline form in the Ceramicrete. Thus, the reaction of oxide in the inorganic phosphate composition as disclosed herein is likely more complete and/or the amount of crystalline oxide is substantially reduced, resulting in a substantially reduced crystallinity product suitable for coatings.

Example 2

Aluminum Phosphate Compositions 30 g of aluminum hydroxide (gibbsite, Al(OH)$_3$) were added at room temperature to 173.4 g of phosphoric acid solution (H$_3$PO$_4$, 50 wt. %, molar ratio Al(OH)$_3$:H$_3$PO$_4$=1:2.3). 1.5 g (5 wt %) of potassium fluoride, and 1.5 g of potassium permanganate were added to the acid together with Al(OH)$_3$. The mixture was stirred for 60 min to about 3 hours at 100-110° C. The resultant product after cooling to room temperature was a viscous paste. This was labeled acid component A.

Potassium permanganate, as an exemplary oxidizer, was added as an optional reagent to reduces hydrogen formation in Example 2. Use of an oxidizer provides improved adhesion to surfaces, such as steel/iron surfaces. Results of coatings of the composition of Example 2 on steel/substrates provided improved adhesion between the inorganic phosphate composition and the metal compared to its adhesion in the absence of the oxidizer. Other suitable oxidizers may be used, for example, water soluble oxidizers, such as potassium chromate, sodium chromate, or nitrates of potassium, magnesium, and aluminum.

Figure 3:
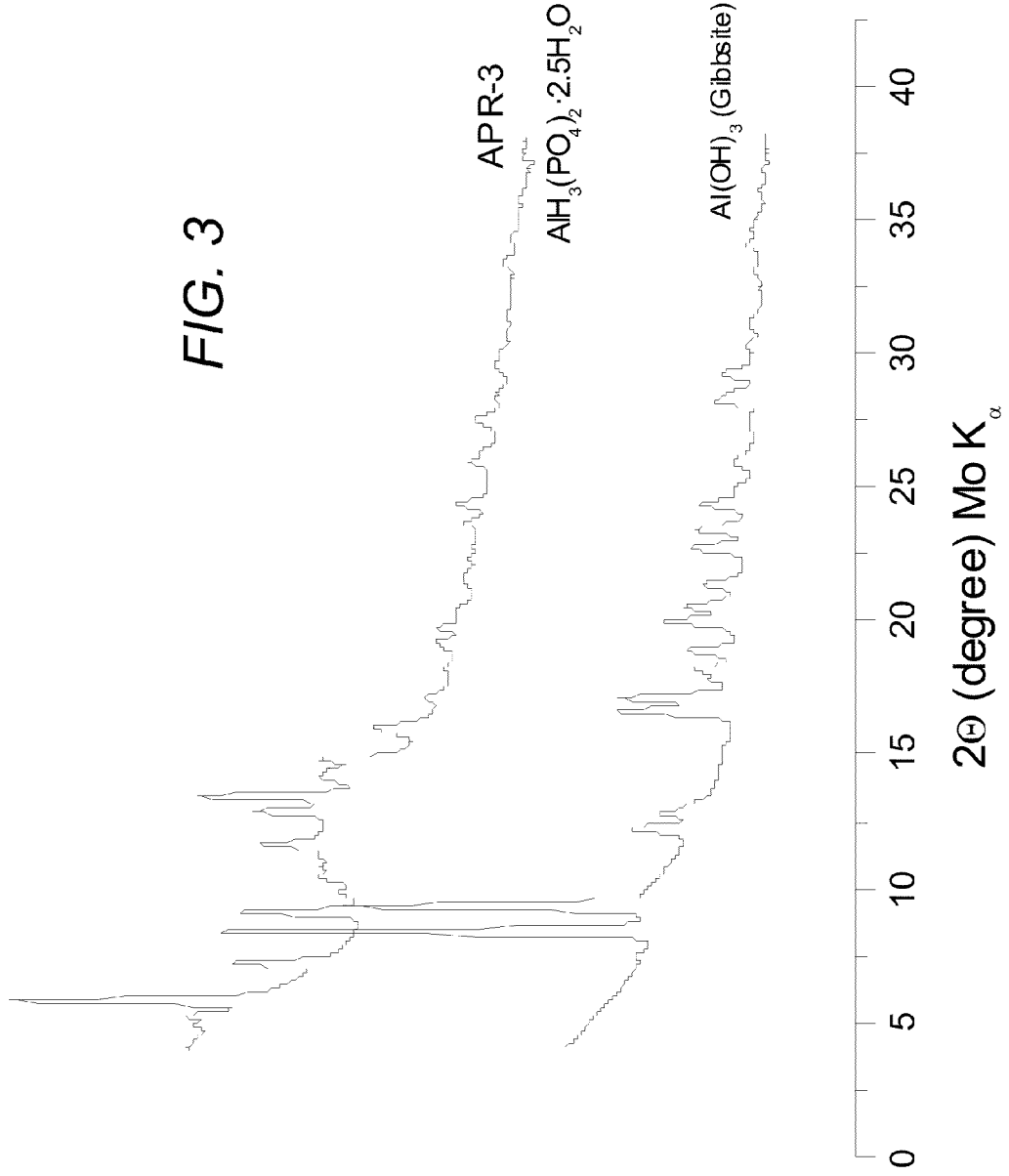
FIG. 3. Depicts an X-ray diffraction pattern of alumophosphate ($AlH_3(PO_4)_2 \cdot 2.5H_2O$) A, and $Al(OH)_3$ as disclosed and described herein, evidencing a reduced crystalline or amorphous phase.
Figure 4:
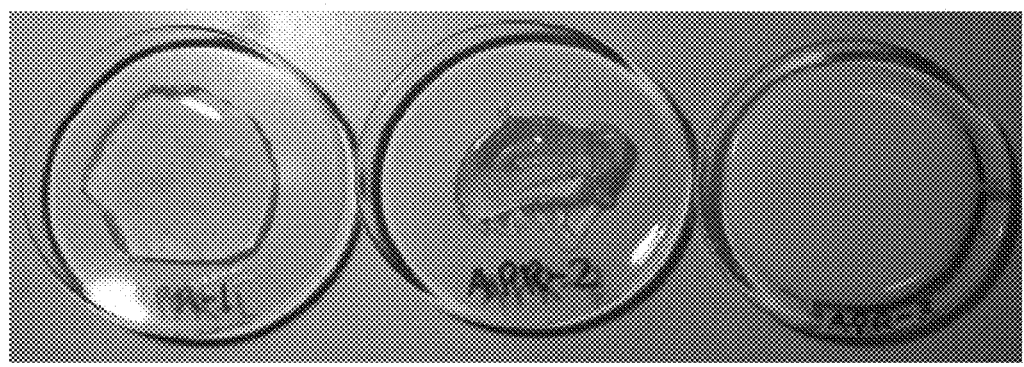
FIG. 4. Is a photograph of an aluminum hydrophosphate gel as disclosed and described herein.

The X-ray diffraction pattern in FIG. 3 shows that aluminum hydroxide, which is fairly crystalline, when mixed with phosphoric acid solution in the process described above, provides a less crystalline form of the aluminum hydroxide as evidenced by the broad halo pattern. In conventional phosphate cements, such an amorphous, non-crystalline phase is insignificant or non-existent (not shown). The amorphous component A results in clear honey-like paste. This may be seen in photographs given in FIG. 4. These were produced with different concentration of aluminum hydrophosphates, but all produce transparent thick gels.

The basic component was produced by mixing wollastonite and MgO in the weight ratio of 3:1 in sufficient water to produce precursor with approximate viscosity of 10,000 centipoise. Similarly, in another experiment, mullite was added instead of wollastonite. The basic component was labeled B. The basic component may be magnesium brine having an effective amount of magnesium hydroxide.

Figure 5:
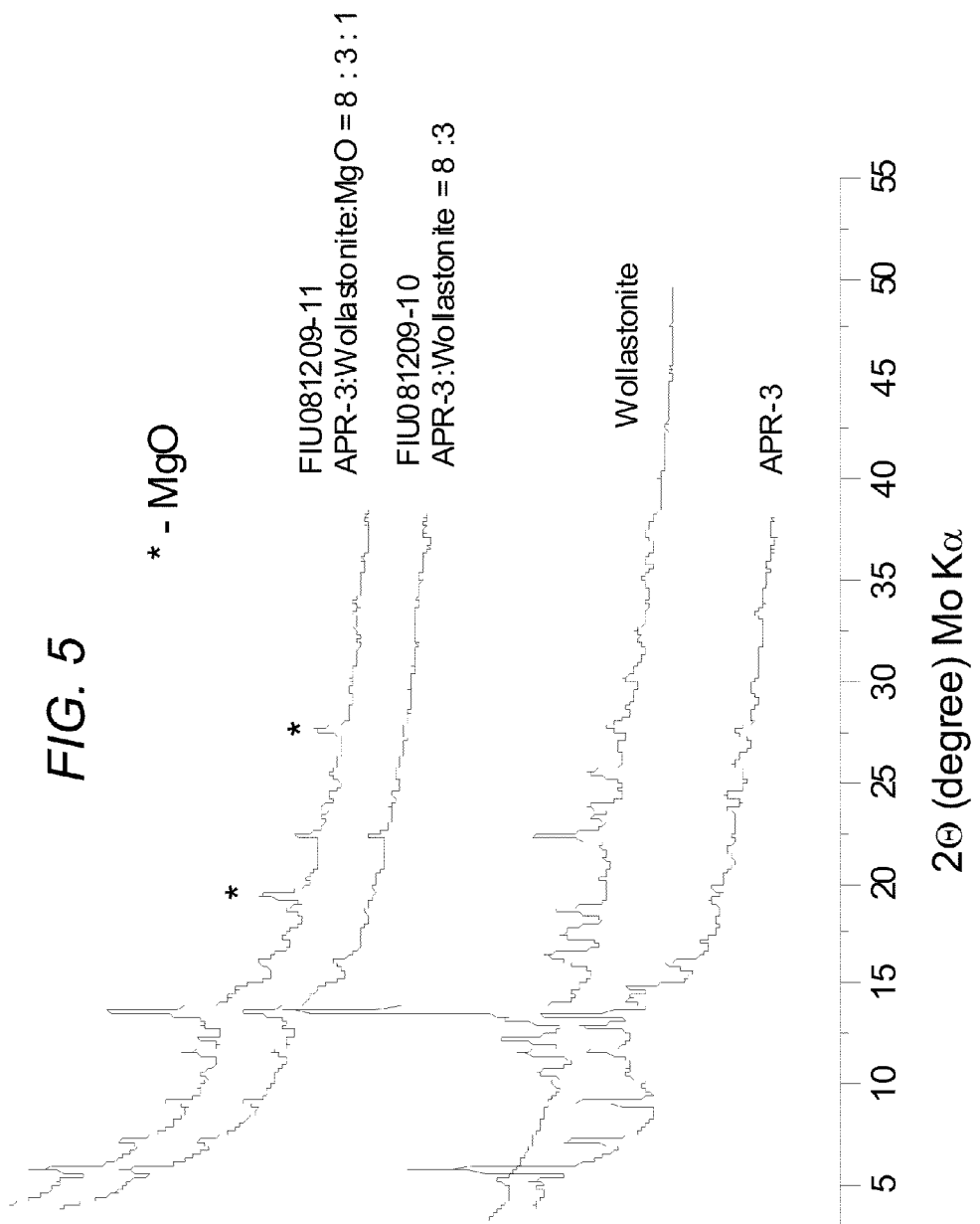
FIG. 5. Depicts an X-ray diffraction pattern of a coating produced from aluminum hydro phosphate, wollastonite, and magnesium oxide as disclosed and described herein.

The two components (A+B) were mixed in a weight ratio of 8:3, and the resultant precursor composition was coated on various substrates that included mild steel, aluminum, wood, and cement board. The samples were allowed to cure for one week. FIG. 5 shows the X-ray diffraction pattern of the coating along with that of wollastonite and the first acidic phosphate component for comparison.

Figure 6:
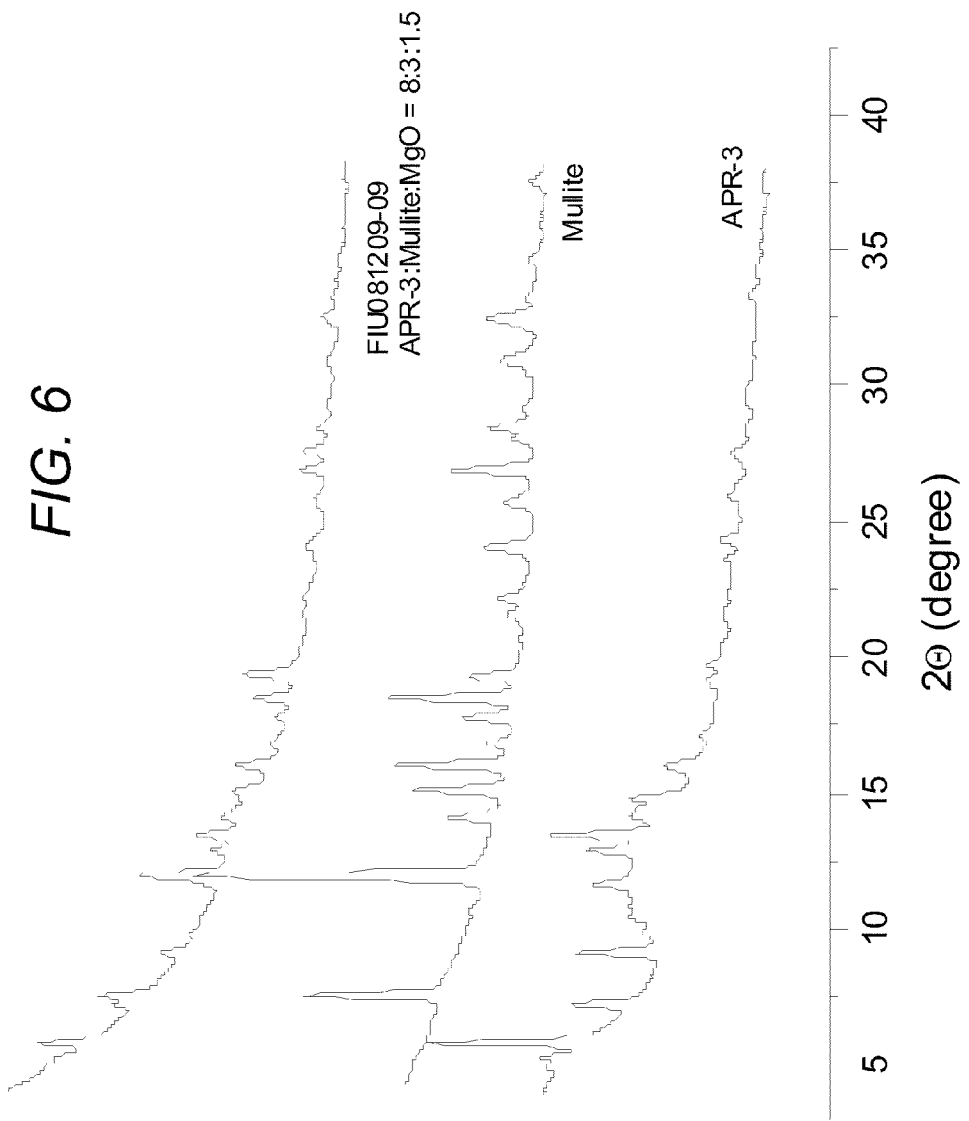
FIG. 6. Depicts an X-ray diffraction pattern of an alumophosphate, MgO and mullite sample disclosed and described herein compared with pure mullite and alumophosphate are shown for comparison.

Similarly, FIG. 6 shows the X-ray diffraction pattern of the coating produced with mullite and Part A, and also a mixture of mullite and magnesium oxide as Part B and aluminum hydro phosphate. All samples were very hard and bonded well to various substrates. The resultant coatings could not easily be scratched and could not be dislodged, even when the substrate was hit against a hard object.

Comparison of the components and the set coating in FIGS. 5 and 6 demonstrate that, though highly crystalline mullite, wollastonite, and magnesium oxide were used as starting materials, the x-ray diffraction peaks associated with these crystalline materials in the set inorganic phosphate composition were substantially reduced in height and were broader than the individual constituents. Thus, the crystallinity of the set inorganic phosphate composition is substantially reduced. While not being held to any particular theory, it is believed that the acidic component is at least partially responsible for developing and or providing this reduced crystalline morphology for the inorganic phosphate composition disclosed and described herein.

Figure 7:
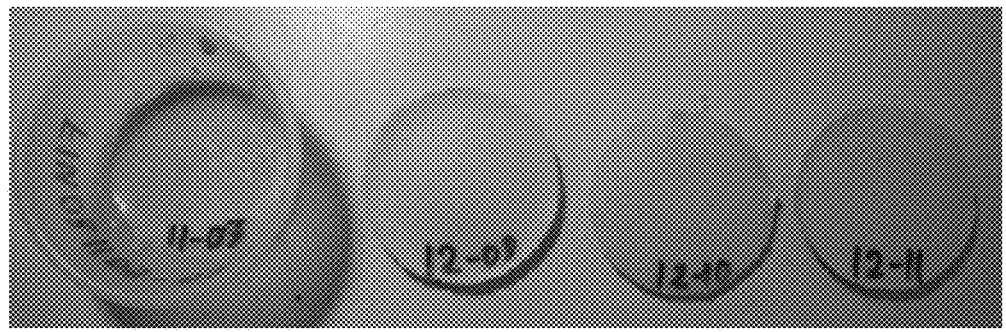
FIG. 7. Depicts coatings produced by using aluminum hydro phosphate and magnesium oxide precursor materials as disclosed and described herein.

FIG. 7 shows these final coatings as sprayed in plastic cups. They all are homogeneous in appearance, smooth on the surface, and dense. Regular Ceramicrete does not exhibit these unique properties, at least because it lacks the reduced crystalline morphology that this present embodiment of the inorganic phosphate compositions disclosed herein have.

Example 3

Methods of Forming Berlinite Coatings

Theoretical analysis based on thermodynamic principles indicate that aluminum trihydrogen phosphate, if reacted with aluminum oxide (corundum, $Al_2O_3$), would produce aluminum phosphate ($AlPO_4$) (berlinite) at about 150° C. Berlinite mineral phase, which is stable up to 1,500° C., would provide a high-temperature coating. Thus, 100 grams of aluminum trihydrogen phosphate ($AlH_3(PO_4)_2 \cdot 5H_2O$) viscous paste as disclosed in Example 2, was mixed with 50 grams of aluminum oxide fine powder and mixed thoroughly to form a thick paste. This was brushed on mild steel substrate pre-heated at 175° C. Initially, some water fraction from the paste evaporated, but the subsequent coating bonded well to the steel. The entire assembly was maintained at 175° C. for about three hours. Once all degassing and evaporation had occurred, a second coat was applied and cured for about three hours at 175° C. The resulting thick coating formed on the steel surface was hard, dense and extremely well bonded to the steel. X-ray diffraction studies of the formed coating prepared from Example 3 indicated that the coating was essentially berlinite. Thus, the methods disclosed and described herein provides for a relatively simple means for preparing berlinite-precursor formulations and thereafter forming berlinite coatings useful for providing high-temperature protection or improving high temperature service of articles, such as metals and other building materials.

Example 4

Inorganic Phosphate Compositions Containing Fly Ash Filler

In this example, alkaline component comprising 55 wt. % brine, 22 wt. % Class F fly ash, 6 wt. % zirconium hydroxide, 14 wt. % water, and 3 wt. % commercial paint conditioner. All components were mixed thoroughly to a form paste of approximate viscosity 10,000 centipoise. The acidic component was prepared as a paste by mixing 68% mono potassium phosphate and 31 wt. % water, a small amount of a suspension agent and cupric oxide to prevent formation of algae.

The two component solutions were used in a plural spray gun at a volume ratio of acidic to alkaline components of 1:1.5. They were sprayed on mild steel plates and standard plates used for abrasion tests. After curing the plates with coatings were tested for abrasion resistance and adhesion in accordance with ASTM protocol. The average values of the results on three different samples as well as a commercial epoxy coating control are given below in Table 3.

TABLE 3

Test results on Example 4 compared to epoxy control.

| Coating system | Adhesion resistance (psi) | Wear cycles/mil | Wear Index (wt. loss per cycle in micrograms) |
|---|---|---|---|
| Fly ash-containing coating | 180 | 360 | 154 |
| Epoxy coating CONTROL | 120 | 120 | 300 |

The results shown in Table 3 demonstrate that in all respects, the inorganic phosphate composition coating comprising fly ash showed better abrasion and wear performance compared to the epoxy control coating. The adhesion resistance is approximately 50% higher, and abrasion performance is at least twice that of epoxy coating. This shows that the inorganic phosphate composition coating comprising fly ash coatings are superior to commercial epoxy coatings.

Example 5

Inorganic Phosphate Compositions Containing Mullite Filler

In this Example, the same composition as in Example 4 was prepared with the exception that instead of fly ash, mullite ($3Al_2O_3 \cdot 2SiO_2$) in fine powder form was used instead. The proportion of the two components (acidic phosphate/basic hydroxide) was the same as Example 4 and samples were prepared by spraying on mild steel and abrasion plates. The results of these tests are given in Table 4.

TABLE 4

Test results on Example 5 coating compared to epoxy Control

| Coating system | Adhesion resistance (psi) | Wear cycles/mil | Wear Index (wt. loss per cycle in micrograms) |
| --- | --- | --- | --- |
| Mullite-containing coating | 143 | 337 | 157 |
| Epoxy coating CONTROL | 120 | 120 | 300 |

As in the case of Example 4, the results of Example 5 show that in all respects, the inorganic phosphate composition coating comprising mullite also shows improved performance characteristics compared to the epoxy control coating. The adhesion resistance of Example 5 is approximately 20% higher, and abrasion performance is at least twice that of epoxy coat. This shows that fly ash coatings are not only viable but are far superior to commercial coatings.

Example 6

Aggregate/Magnesium Potassium Phosphate Composition for Spray Coating without Aggregate Displacement The first (acidic) component consisted of mono potassium phosphate (MKP) having a pH of about 4.2 when measured in aqueous solution. Calcium phosphate precursor can also be used. The MKP powder (about 74 micron size US 200 sieve) was added and the solution pH was adjusted between 3.2 and 3.5 by adding 2.5 wt. % phosphoric acid (added as 50% dilute solution). 0.5 wt. % cupric oxide was optionally added to prevent algae growth. The solution was adjusted with water to yield a viscosity of about 10,000 centipoise. The density of this component (component A) was about 1.9 g/cm$^3$.

The second component (alkaline) was prepared as follows: A requisite amount of magnesium brine solution (Martin Marietta), as a source of magnesium hydroxide, was weighed into a mixer. Zr(OH)$_4$ powder was added to the brine and stirred for 5-10 min until homogenous. Wollastonite passing 325 mesh was added slowly to this solution and mixed for 10-15 min. An additional amount of water was added to adjust the viscosity to approximately 20,000 to 25,000 centipoise. The density of this liquid component was 1.25 g/cm$^3$ and the average particle size of particles in this solution was determined to be about 5.6 micrometers or less. Thus, the second component consisted of about 69 wt. % magnesium brine (providing about 61 wt. % Mg(OH)$_2$), the remainder water. The MgOH brine can be substituted with MgO, preferably calcined MgO. The following are examples of high solids loading phosphate precursor components suitable for spray coating that can be atomized to provide thin film, paint-like coatings. These examples use solids of Part A (e.g., MKP) and Part B (e.g. MgO). Substitutions of either Part as described above is envisaged. Table 5 summarizes exemplary atomizable compositions (Sample 1 & 2).

TABLE 5

Atomizable Compositions

| | | % solids | Viscosity (cp) | Density (g/cc) | pH | Suspension agent wt % |
| --- | --- | --- | --- | --- | --- | --- |
| Sample 1 | Part A | ~73% | ~30,000+ | ~2.2 | 3.3 | 0.15-1.5 |
| | Part B | ~60% | ~25,000+ | ~2.0 | 10.4 | |
| Sample 2 | Part A | ~63-64% | ~14,000 | ~1.55 | 3.3 | 0.15-1.5 |
| | Part B | ~54% | ~13,000 | ~1.5 | 10.4 | |

Sample 3: To an amount of water, to which is added a required amount of 85% phosphoric acid, is added the acid phosphate precursor (e.g. monopotassium phosphate (MKP)) and mixed for less then a minute, followed by the addition of the suspension agent (e.g., xanthan gum) with mixing for 10 minutes with a high shear dispersion blade. The water-phosphate mixture will become thick and change color to opaque, then add required amount of MKP to the suspension. In the above Samples (1 and 2) about 1 to 60 wt % resin coated silica (Estes Colored Aggregates obtained from Clifford Estes Company, Fairfield, N.J.; particle sized between about 30-70 mesh) can be distributed all in one component Part or distributed (equally or non-equally) in either component Part. Aggregate colorant of 30-325 mesh size at a wt % solids loading of abut 1 to 60 is also useful in the instant formulations. Preferably, the Estes colored aggregates can be added to Part A at a level of about 0-30 wt % solids or more. In at least one example, 6 wt % of Estes colored aggregates was used in the above Sample 2 and provided excellent color and appearance in the final coating. It has also been observed that colored art sand or naturally colored sand and aggregate can be employed with similar results. In the above Samples, about 0.2 wt % xanthan gum was used as suspension agent, (about 0.05 wt % used in Part B). The two components were combined in the volume ratio of 1:1 for spray using a plural spray system having a peristaltic pump. Similar results can be achieved using high pressure piston pumps (airless spray) that provide high pressure to atomize. Alternatively a multi-channel pump, a plural piston pump, a ram discharge extruder, a two-component caulking gun or a progressive cavity pump with static mixing and air-assist for atomizing can be used. The two cartridges of the spray system were filled separately with the two components. The spray gun consisted of a mixing tube, in which the two components could be mixed prior to spraying. The composition was sprayed on different substrates e.g., steel, wood, hardboard, aluminum, concrete, mild steel Taber panels. The thickness coated was approximately 5 mil and had a noticeable color from the aggregate colorant. Coatings up to about 20 mil are achievable using the method disclosed herein. The coatings were allowed to cure at ambient conditions and resulted in excellent coatings with phosphate cement characteristics. In contrast, ordinary sprayed paint required thin (<2 mils) to avoid run or sag that would not hold similar amounts of aggregate of any size. Thus, in one aspect, other non-ceramic, rapid set/cure coatings can employ such aggregates provided the coating thickness is at least 20 mil so as to provide some mechanical securing of the aggregate.

Moreover, unlike ordinary paint that takes a long time to dry allowing the aggregate to migrate from its initially deposited location and/or fall out before it can be "mechanically"

held in place, the instant phosphate ceramic spray composition sets rapidly and at least mechanically holds the aggregate in place sufficiently to be sprayed on vertical surfaces and overhead surfaces without the aggregate migrating or falling out.

In one aspect, the instant phosphate ceramic spray composition with resin coated silica aggregate does not substantially bind to the resin coating of the aggregate, thus improving the aesthetics of the coating, e.g., by not coating or covering portions of the resin coating, thus allowing the color of the aggregate to be visualized to a greater extent. This is augmented by the naturally semi-translucent appearance of a pigment-free phosphate ceramic resulting in a more vibrant color appearance.

In another aspect, the instant phosphate ceramic spray coating can comprise other aggregate to add texture. In another aspect, the instant phosphate ceramic spray coating can comprise non-colored natural aggregate (e.g., sand, talc, etc.) to give natural finish, for example, a sand plaster type finish in a single color.

In another aspect, the instant phosphate ceramic spray composition is used as a primer layer for a substrate, for example, a metal surface, and is subsequently coated with a polymer coating such as an acrylic or urethane coating. The metal surface can be a transportation vehicle for example, a chassis. If desired, aluminum oxide can be added to either or both of the first and second components in an amount sufficient to increase the hardness of the resultant phosphate ceramic.

While the above aggregate phosphate ceramic composition is disclosed as useful for a spray system, the same textured and/or colorant composition is suitable for application by non-spraying coating methods, such as by trowel, etc.

All numbers expressing quantities of ingredients, reaction conditions, and so forth used in the specification may be to be understood as being modified in all instances by the term "about." Accordingly, unless indicated to the contrary, the numerical parameters set forth herein may be approximations that may vary depending upon the desired properties sought to be obtained.

The above description discloses several methods and materials. These descriptions are susceptible to modifications in the methods and materials, as well as alterations in the fabrication methods and equipment. Such modifications will become apparent to those skilled in the art from a consideration of this disclosure or practice of the disclosure. Consequently, it is not intended that this disclosure be limited to the specific embodiments disclosed herein, but that it cover all modifications and alternatives coming within the true scope and spirit of the claims.

We claim:

1. A phosphate ceramic spray composition comprising an atomized combination of:
   a first component comprising a high-solids content aqueous suspension of an acid-phosphate of chemical formula $A_m(H_2PO_4)_m \cdot nH_2O$, where A is hydrogen ion, ammonium cation, metal cation, or mixtures thereof; where m=1-3, and n=0-6; the first component suspension adjusted to a pH of about 2 to about 5; wherein the high solids content of first component is at least 63 wt % of the aqueous suspension;
   a second component comprising shear-thinned, high solids content aqueous suspension of an alkaline oxide or alkaline hydroxide represented by $B_{2m}O_m$, $B(OH)_{2m}$, or mixtures thereof, where B is an element of valency 2m (m=1, 1.5, or 2) the second component suspension adjusted to a pH of between 9-14; wherein the high solids content of second component is at least 54 wt % of the aqueous suspension; and
   a rheology modifier/suspending agent present in an amount providing the shear thinned second component, the rheology modifier/suspending agent further suspending the high solids content of either the first component or the second component in their respective aqueous suspensions; and
   optionally, aggregate material present in an amount in at least one of the first and the second component capable of imparting an observable color and/or texture.

2. The phosphate ceramic spray composition of claim 1, wherein the second component is at least one of magnesium hydroxide and calcium hydroxide.

3. The phosphate ceramic spray composition of claim 1, wherein the first component comprises about 2 to about 10 wt % phosphoric acid and wherein the first component comprises at least one of mono potassium phosphate and mono calcium phosphate.

4. The phosphate ceramic spray composition of claim 1, further comprising aluminum oxide.

5. The phosphate ceramic spray composition of claim 1, wherein the rheology modifier/suspending agent is at least one of guar gum, diutan gum, welan gum, and xanthan gum present in an amount of 0.15 to 1.5 wt %.

6. The phosphate ceramic spray composition of claim 5, wherein the aggregate is present in an amount of at least about 1 wt % to about 60 wt % distributed in the first component or the second component, or distributed equally or non-equally in both the first component and the second component.

7. The phosphate ceramic spray composition of claim 6, wherein the aggregate is at least one of a resin coated silica and a naturally colored mineral aggregate.

8. The phosphate ceramic spray composition of claim 6, wherein the aggregate is of an average particle size of about 20 mesh micron to about 400 mesh.

9. The phosphate ceramic spray composition of claim 6, wherein the aggregate is of an average particle size of at about 20 mesh to about 400 mesh and, after application of a coating of less than about 20 mil and prior to drying, substantially retains the aggregate in the coating on a vertical surface or an overhead surface.

10. The phosphate ceramic spray composition of claim 1, wherein at least the first component is milled to an average particle size of less than 70 microns.

11. A method of atomizing a sprayable phosphate ceramic composition, the method comprising
   providing (i) a first component comprising a high-solids content aqueous suspension of an acid-phosphate of chemical formula $A_m(H_2PO_4)_m \cdot nH_2O$, where A is hydrogen ion, ammonium cation, metal cation, or mixtures thereof; where m=1-3, and n=0-6; the first component suspension adjusted to a pH of about 2 to about 5; wherein the high solids content of first component is at least 63 wt % of the aqueous suspension;
   (ii) shear-thinning a second component comprising high solids content aqueous suspension of an alkaline oxide or alkaline hydroxide represented by $B_{2m}O_m$, $B(OH)_{2m}$, or mixtures thereof, where B is an element of valency 2m (m=1, 1.5, or 2) the second component suspension adjusted to a pH of between 9-14; wherein the second component is separated from the first component prior to atomization; wherein the high solids content of second component is at least 54 wt % of the aqueous suspension; and
   (iii) a rheology modifier/suspending agent present in an amount providing the shear thinned second component prior to exiting the dispensing device, the rheology modifier/suspending agent further suspending the high solids content of either the first component or the second component in their respective aqueous suspensions, resulting in a decrease in the viscosity thereof for atomization; and (iv) optionally, aggregate material present in an amount in at least one of the first and the second component capable of imparting an observable color and/or texture; and atomizing the first component and second component.

12. The method of claim 11, wherein the step of atomizing comprises urging the first component and the second component through an atomizing orifice using at least one of a multi-channel pump, a plural piston pump, peristaltic pump, a ram discharge extruder, and a progressive cavity pump.

13. The method of claim 11, wherein the step of atomizing further comprises a mixer configured to mix the first component, the second component, and the aggregate.

14. The method of claim 11, wherein the step of atomizing comprises dispensing the first and second components essentially simultaneously.

15. The method of claim 11, wherein the rheology modifier/suspending agent is at least one of guar gum, diutan gum, welan gum, and xanthan gum.

16. The method of claim 11, wherein the aggregate is present in an amount of at least about 1 wt % to about 60 wt %.

17. The method of claim 16, wherein the aggregate is of an average particle size of about 20 mesh to about 400 mesh.

18. The method of claim 16, wherein the aggregate is at least one of an aggregate colorant comprising a naturally colored mineral aggregate and an aggregate colorant comprising resin coated silica.

19. The method of claim 17, wherein the aggregate is of an average particle size providing surface texture to the spray composition after application.

20. The method of claim 11, further comprising the step of forming a coating of less than about 20 mil thickness and retaining the aggregate in the coating when applied to a vertical surface or overhead surface, wherein the aggregate is at least 400 mesh.

21. A product coated by the method of claim 11.

* * * * *